(12) United States Patent
Grancharov et al.

(10) Patent No.: US 11,694,346 B2
(45) Date of Patent: Jul. 4, 2023

(54) OBJECT TRACKING IN REAL-TIME APPLICATIONS

(71) Applicant: Telefonaktiebolaget LM Ericsson (publ), Stockholm (SE)

(72) Inventors: Volodya Grancharov, Solna (SE); Harald Pobloth, Täby (SE); Sigurdur Sverrisson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 255 days.

(21) Appl. No.: 17/253,475

(22) PCT Filed: Jun. 27, 2018

(86) PCT No.: PCT/EP2018/067242
§ 371 (c)(1),
(2) Date: Dec. 17, 2020

(87) PCT Pub. No.: WO2020/001759
PCT Pub. Date: Jan. 2, 2020

(65) Prior Publication Data
US 2021/0264619 A1      Aug. 26, 2021

(51) Int. Cl.
*G06T 7/246*     (2017.01)
*G06T 7/73*      (2017.01)
(Continued)

(52) U.S. Cl.
CPC .............. *G06T 7/251* (2017.01); *G06T 7/248* (2017.01); *G06T 7/73* (2017.01); *G06T 17/00* (2013.01);
(Continued)

(58) Field of Classification Search
CPC ..................... G06T 7/248; G06T 7/251; G06T 2207/10016; G06T 17/00; G06T 19/006;
(Continued)

(56) References Cited

U.S. PATENT DOCUMENTS

2013/0114849 A1    5/2013  Pengelly et al.
2018/0038689 A1*   2/2018  Takemura ................. G06T 7/11
(Continued)

OTHER PUBLICATIONS

Chakravorty, Tanushri, "Robust face tracking in video sequences", PhD thesis, Ecole Polytechnique de Montreal, Dec. 21, 2017, pp. 1-121.

(Continued)

*Primary Examiner* — Phi Hoang
(74) *Attorney, Agent, or Firm* — Murphy, Bilak & Homiller, PLLC

(57) ABSTRACT

An object tracking, in particular adapted for real-time augmented reality applications, involves determining a location of an object (20) in a current frame (10) of a video stream (15), at a point in time following output of a preceding frame (11) of the video stream (15) but preceding output of the current frame (10), by starting from a location of the object (20) determined by an object-detection server (5) for a previous frame (12) of the video stream (15) and recursively track the location of the object (20) in frames (11) of the video stream (15) following the previous frame (12) up to the current frame (10) and recursively update a model of the object (20). Accurate objection detection from an object-detection server (5) can thereby be used even if the object was detected in a past frame (12) of the video stream (15) that has already been visualized.

19 Claims, 17 Drawing Sheets

(51) Int. Cl.
*G06T 17/00* (2006.01)
*G06T 19/00* (2011.01)
*G06T 19/20* (2011.01)

(52) U.S. Cl.
CPC ............ *G06T 19/006* (2013.01); *G06T 19/20* (2013.01); *G06T 2207/10016* (2013.01); *G06T 2210/12* (2013.01); *G06T 2219/2016* (2013.01)

(58) Field of Classification Search
CPC ....... G06T 19/20; G06T 7/73; G06T 2210/12; G06T 2219/2016
See application file for complete search history.

(56) References Cited

U.S. PATENT DOCUMENTS

| | | | |
|---|---|---|---|
| 2018/0137892 A1* | 5/2018 | Ding | G11B 27/28 |
| 2018/0293449 A1* | 10/2018 | Sathyanarayana | G05D 1/0055 |
| 2019/0050629 A1* | 2/2019 | Olgiati | G06T 7/20 |
| 2019/0188866 A1* | 6/2019 | Mehrseresht | G06N 3/044 |

OTHER PUBLICATIONS

Chen, Tiffany Yu-Han, et al., "Glimpse: Continuous, Real-Time Object Recognition on Mobile Devices", Proceedings of the 13th ACM Conference on Embedded Networked Sensor Systems—SenSys '15; http://hdl.handle.net/1721.1/110758, Nov. 1, 2015, pp. 155-168.

Gammeter, Stephan, et al., "Server-side object recognition and client-side object tracking for mobile augmented reality", Computer Vision and Pattern Recognition Workshops (CVPRW), 2010 IEEE Computer Society Conference, Jun. 13, 2010, pp. 1-8.

Redmon, Joseph, et al., "YOLO9000: Better, Faster, Stronger", IEEE Conference on Computer Vision and Pattern Recognition (CVPR), 2017, pp. 1-10.

Ren, Shaoqing, et al., "Faster R-CNN: Towards Real-Time Object Detection with Region Proposal Networks", IEEE Transactions on Pattern Analysis and Machine Intelligence; 39(6), 2017, pp. 1137-1149.

Viola, Paul, et al., "Rapid Object Detection using a Boosted Cascade of Simple Features", Proceedings of the 2001 IEEE Computer Society Conference on Computer Vision and Pattern Recognition, 2001, pp. 511-518.

* cited by examiner

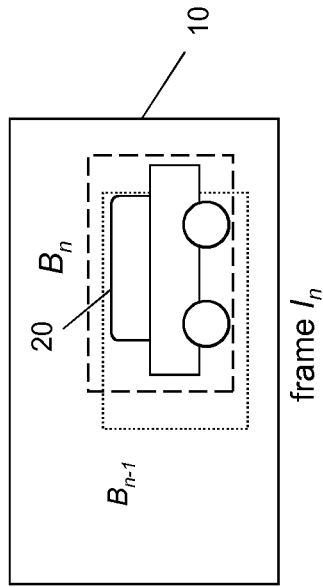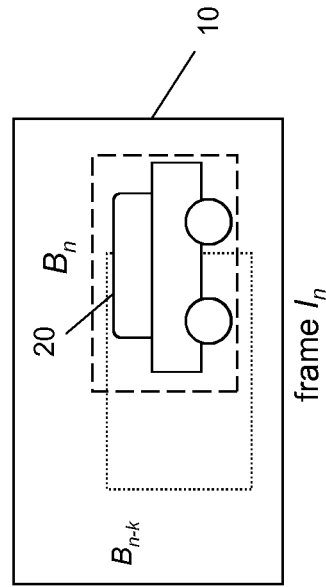
Fig. 3
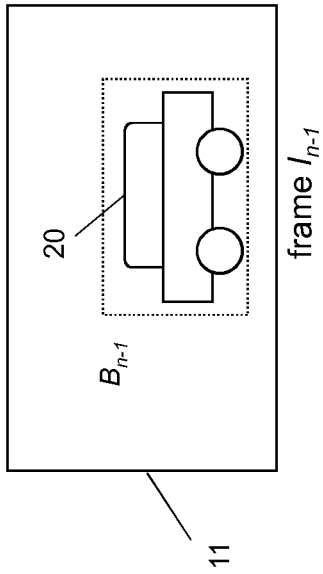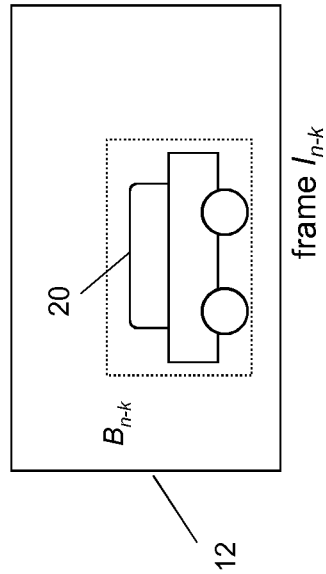
Fig. 4

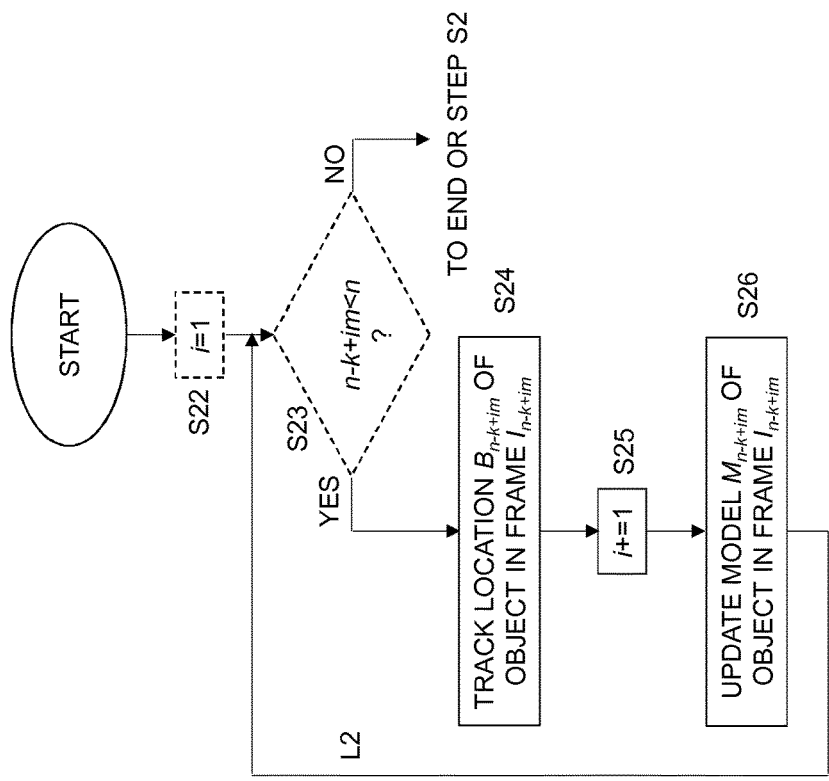
Fig. 21
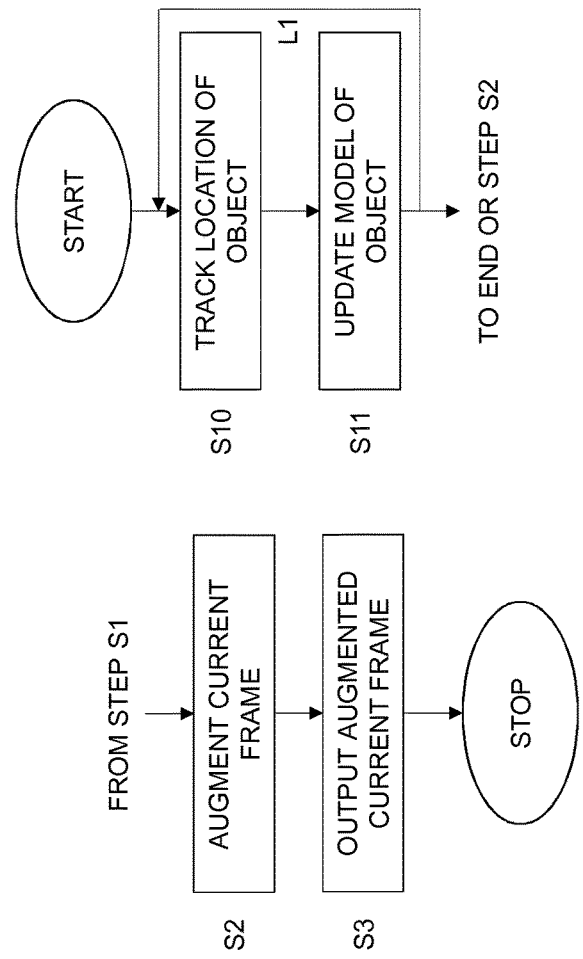
Fig. 20
Fig. 19

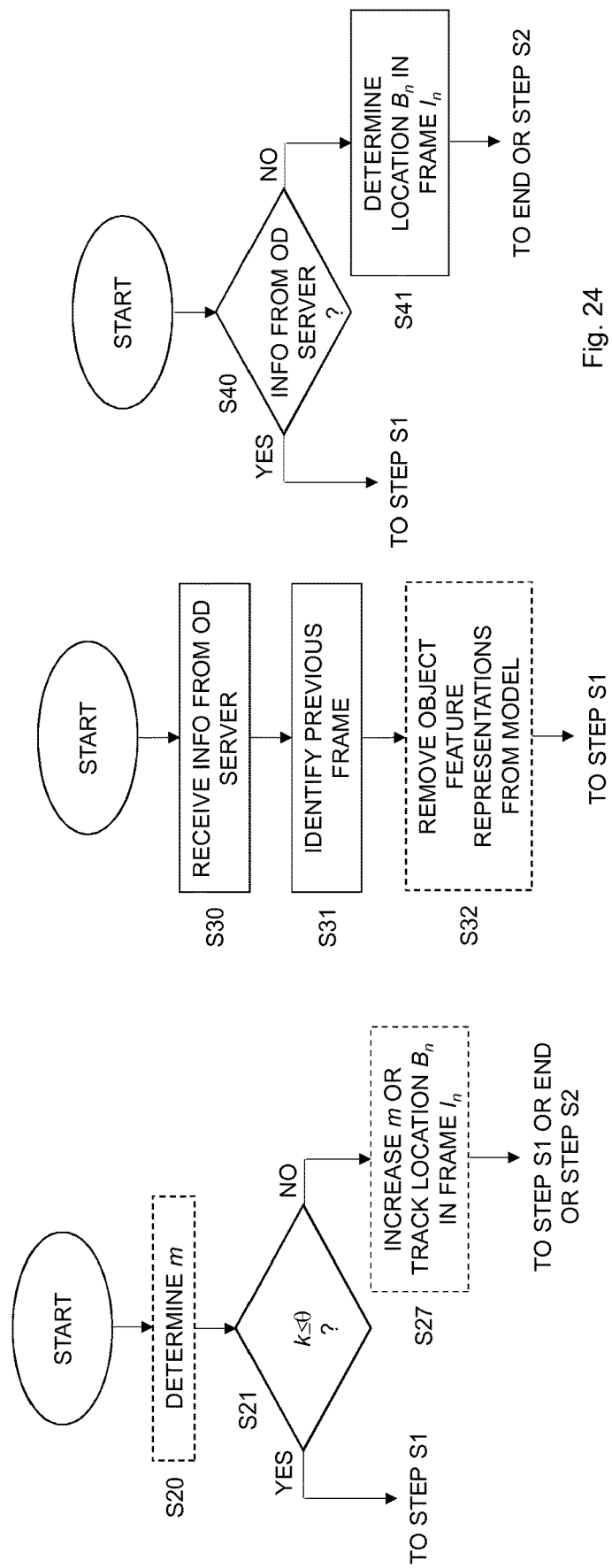

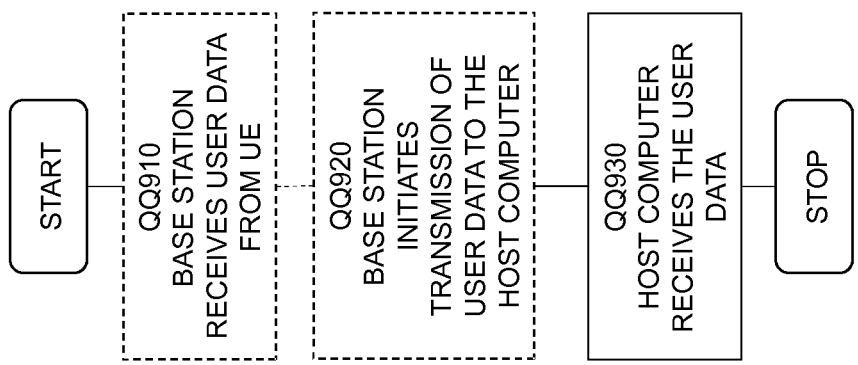

OBJECT TRACKING IN REAL-TIME APPLICATIONS

TECHNICAL FIELD

The present embodiments generally relate to object tracking, and in particular to such object tracking in connection with real-time applications.

BACKGROUND

Augmented reality (AR) is a direct or indirect live view of a physical, real-world environment whose objects are augmented, i.e., perceptually enriched, by computer-generated perceptual information. The overlaid perceptual information can be constructive, i.e., additive to the natural environment, or destructive, i.e., masking of the natural environment.

An increasing number of AR applications for user devices, such as smart phones and tablets, have been developed to overlay virtual objects on the real-world view. The core technological challenges in such applications are:
1) identifying real-world objects and their positions on the screen, typically denoted object detection (OD) or object recognition in the art;
2) tracking objects of interest, typically denoted object tracking (OT) in the art; and
3) augmenting the scene with artificial objects, labels, or other types of perceptual information.

Some of the best solutions in the area of OD are considered to be based on Deformable Part Models (DPM) with Histogram of Oriented Gradients (HOG) features. In the last years, even more accurate solutions based on Convolutional Neural Network (CNN) technology are being considered as state of the art in the area. These solutions very accurately detect objects in a given video frame or image, but require significant processing power to operate in real-time. Therefore, CNNs typically run on servers equipped with modern Graphics Processing Units (GPUs) with large amount of memory. These servers deploy large offline-trained models, built on several hundred of thousand or million of labeled video frames or images.

Contrary to OD, most OT solutions are based on lightweight algorithms that can run on the client side, i.e., in a wireless device, such as a smart phone or tablet. These OT solutions are capable of tracking a previously detected object over video frames, i.e., determine the location of the object over time. OT algorithms typically perform a matching of a representation of an object model built from the previous video frame(s) with representations retrieved from the current video frame.

In the context of augmented reality, there are, thus, three main implementation configurations.

Firstly, both OD and OT run on the client side. This is a preferred solution for AR applications with real-time constrains. A drawback with this implementation configuration is that powerful and accurate object detection has to be replaced by lightweight solutions that are adapted to the capabilities of the client, typically at the cost of decreased detection accuracy.

Secondly, both OD and OT run on the server side. This implementation configuration addresses the problem with computational requirements of the objection detection. However, real-time AR applications cannot be guaranteed due to the need of communicating video frames between the client and the server.

Thirdly, OT runs on the client side with OD running on the server side. This implementation configuration resolves to a large extend the issues related with complexity and memory requirements for the object detection but has similar shortcomings with regard to real-time performance as the implementation of both OD and OT on the server side. By the time the video is streamed to the server, where object detection is performed and the resulting detection information is returned to the client, the relevant video scene will already be in the past and has already been output for visualization at the client.

Thus, the different implementation configurations have different trade-offs between complexity, memory requirements, real-time requirements and accuracy. There is therefore a need for an efficient object tracking implementation that can be used in real-time applications, such as real-time augmented reality applications.

SUMMARY

It is a general objective to provide an efficient object tracking in real-time applications.

It is a particular objective to provide an object tracking that can be used in real-time augmented reality applications.

These and other objectives are met by embodiments as disclosed herein.

An aspect of the embodiments relates to an object tracking (OT) device. The OT device is configured to determine a location of an object in a current frame of a video stream, at a point in time following output of a preceding frame of the video stream but preceding output of the current frame, by starting from a location of the object determined by an object detection (OD) server for a previous frame of the video stream and recursively track the location of the object in frames of the video stream following the previous frame up to the current frame and recursively update a model of the object up to a model of the object associated with the current frame. Each model associated with a given frame of the video stream comprises at least one object feature representation extracted from at least one frame of the video stream preceding the given frame.

Another aspect of the embodiments relates to an object tracking method. The method comprises determining a location of an object in a current frame of a video stream, at a point in time following output of a preceding frame of the video stream but preceding output of the current frame, by starting from a location of the object determined by an OD server for a previous frame of the video stream and recursively track the location of the object in frames of the video stream following the previous frame up to the current frame and recursively update a model of the object up to a model of the object associated with the current frame. Each model associated with a given frame of the video stream comprises at least one object feature representation extracted from at least one frame of the video stream preceding the given frame.

A further aspect of the embodiments relates to a computer program comprising instructions, which when executed by at least one processor, cause the at least one processor to determine a location of an object in a current frame of a video stream, at a point in time following output of a preceding frame of the video stream but preceding output of the current frame, by starting from a location of the object determined by an OD server for a previous frame of the video stream and recursively track the location of the object in frames of the video stream following the previous frame up to the current frame and recursively update a model of the object up to a model of the object associated with the current frame. Each model associated with a given frame of the video stream comprises at least one object feature representation extracted from at least one frame of the video stream preceding the given frame.

A related aspect of the embodiments defines a carrier comprising a computer program according to above. The carrier is one of an electronic signal, an optical signal, an electromagnetic signal, a magnetic signal, an electric signal, a radio signal, a microwave signal, or a computer-readable storage medium.

The present embodiments enable usage of accurate object detection in real-time object tracking applications, such as for real time augmented reality applications with a client-server architecture. The object tracking can thereby use accurate object detection updates from a remote OD server even if such updates have been generated for past, already output frames of a video stream and may be arriving with varying delays. Accordingly, an accurate object tracking, partly based on object detection updates from a remote OD server, can be performed in an OT device even in real-time applications where frames are output in real time.

BRIEF DESCRIPTION OF THE DRAWINGS

The embodiments, together with further objects and advantages thereof, may best be understood by making reference to the following description taken together with the accompanying drawings, in which:

FIG. 3 schematically illustrates object tracking between adjacent frames of a video stream;

FIG. 4 schematically illustrates object tracking based on location of an object from an object detection server;

FIG. 5 is a schematic block diagram of a wireless device according to an embodiment;

FIG. 19 is a flow chart illustrating additional, optional steps of the method shown in FIG. 18 according to an embodiment;

FIG. 20 is a flow chart of an object tracking method according to another embodiment;

FIG. 21 is a flow chart of an object tracking method according to a further embodiment;

FIG. 22 is a flow chart illustrating additional, optional steps of the method shown in FIG. 21 according to an embodiment;

FIG. 23 is a flow chart illustrating additional, optional steps of the method shown in FIG. 18 according to an embodiment;

FIG. 24 is a flow chart illustrating additional, optional steps of the method shown in FIG. 18 according to an embodiment;

FIG. 29 is a flowchart illustrating a method implemented in a communication system in accordance with an embodiment.

DETAILED DESCRIPTION

Throughout the drawings, the same reference numbers are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The present embodiments generally relate to object tracking, and in particular to such object tracking in connection with real-time applications.

Figure 1:
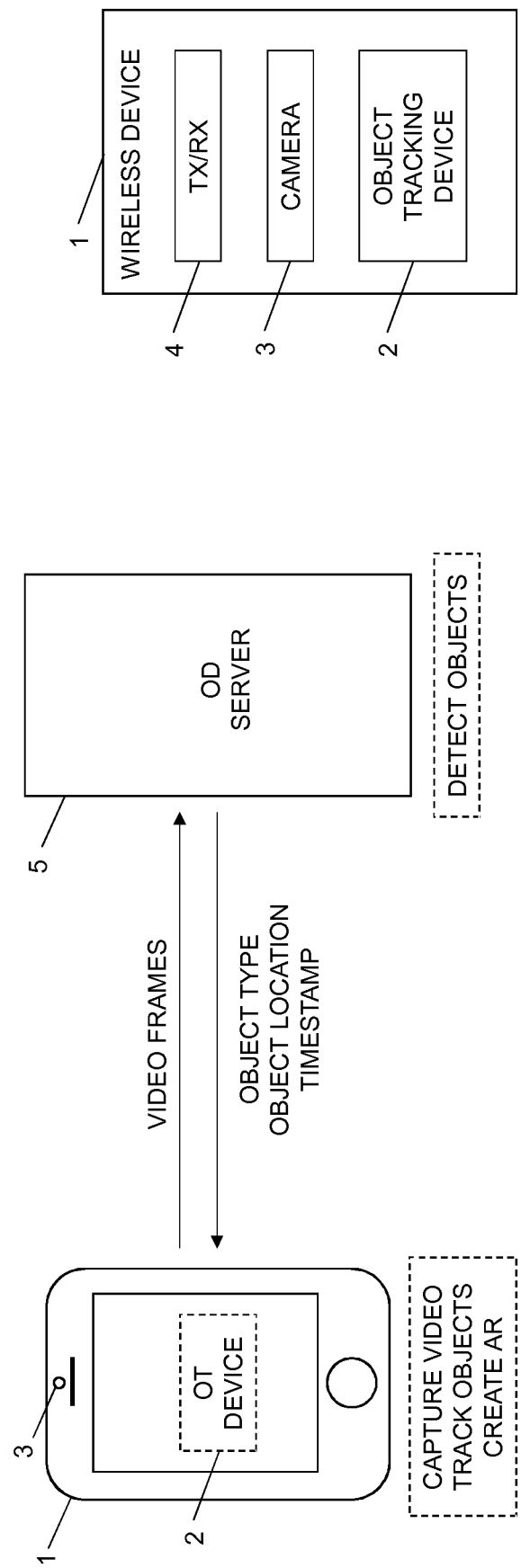
FIG. 1 is an overview of a client-server architecture with object tracking in a wireless device and object detection in a server.

A client-server architecture for augmented reality according to an embodiment shown in FIG. 1. The client 1, represented by a wireless device 1 in FIG. 1, comprises or is connected to a camera 3 used to capture a video sequence.

Video frames, for simplicity referred to as frames herein, of the video sequence are then sent from client 1 to an objection detection (OD) server 5. This frame transmission could involve streaming the video sequence to the OD server 5, i.e., substantially transmitting all the frames of the video sequence to the OD server 5. In an alternative embodiment, individual, typically timestamped frames are sent to the OD server 5 for object detection.

The OD server 5 performs object detection on the received frames, or at least for a portion thereof. This object detection involves identifying objects in a processed frame and determining information of the detected object, including object type and object location. Object type defines the type or class of the detected object, such as car, pedestrian, house, etc. Object location represents the location of the detected object within the processed frame. This so called detection information, i.e., object type and object location, is returned to the client 1 together with an indication of for which frame the object detection has been performed, such as in terms of a timestamp of the relevant frame.

The object location as determined by the OD server 5 is then used by the client 1, or rather an object tracking (OT) device 2 implemented or arranged in the client 1, to (re-)initialize the tracking of the relevant object. Correspondingly, the object type is used for the augmentation on the screen.

Figure 2:
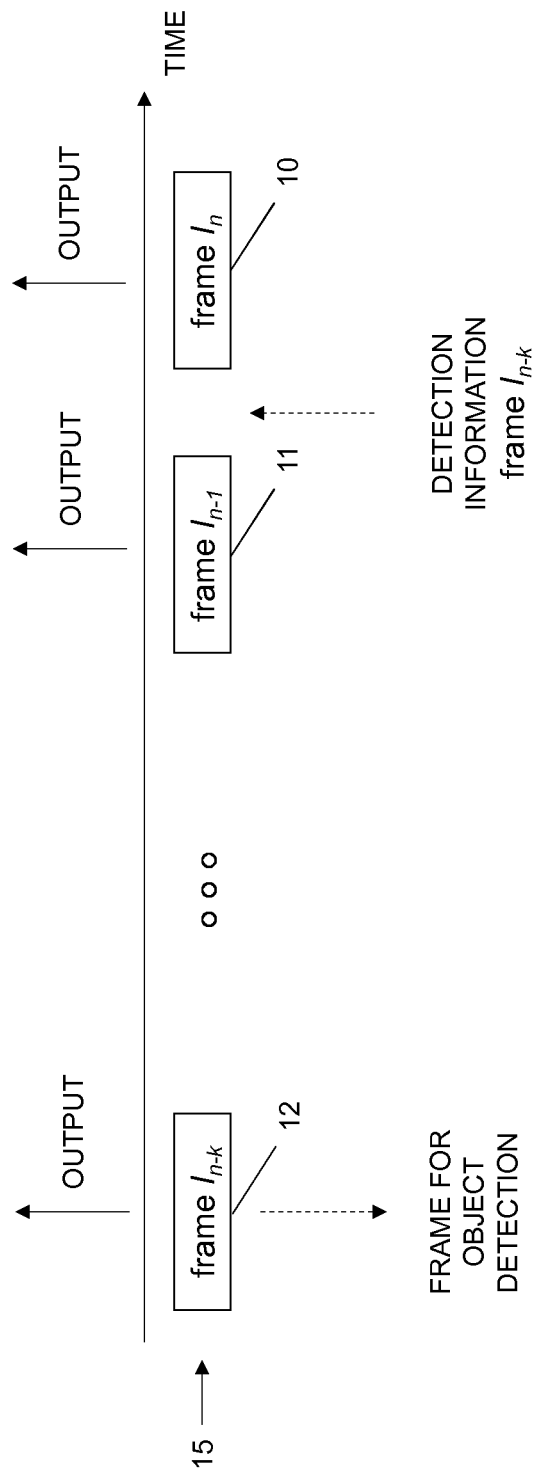
FIG. 2 schematically illustrates a time line of frame output with remote object detection and local object tracking according to an embodiment.

FIG. 2 schematically illustrates a time line of frame output with remote object detection and local object tracking, such as implemented in the client-server architecture of FIG. 1. At the client side, the objects are tracked and visualized, i.e., output for display, in real-time. However, there is a delay in receiving the detection information from the remote OD server. This delay involves both delay or processing time in the computationally complex object detection at the OD server and delay due to the transmission of frames 12 of a video stream 15 and return of detection information. Both types of delay may also vary and change over time based on, for instance, current OD server load and current network conditions.

FIG. 2 illustrates this concept. The client is about to output a frame $I_{n-k}$ 12 for output on its display, n, k are positive integers. The client additionally sends this particular frame $I_{n-k}$ 12 to the OD server for object detection. In the meantime the object tracking is operating on each subsequent frame 11 and these frames 11 are further output for display. Once the client receives the detection information for frame $I_{n-k}$ 12 from the OD server, the object tracking and frame display has continued up to frame $I_n$ 10. This means that the detection information received at the client in connection with frame $I_n$ 10, however, relates to at least one object in a past frame $I_{n-k}$ 12 that has already been output for display. Thus, the detection information is outdated and not relevant for the current frame $I_n$ 10.

The present invention solves the above presented problem that occurs in connection with real-time applications, such as real-time AR applications, with a client-server architecture, in which the object tracking is run locally on the client, whereas the object detection is done remotely at an OD server. In more detail, the invention is based on intelligent synchronization between locations or positions and updates of the model of objects of interest in the OT device and the ones delivered by the OD server. The invention thereby uses an asynchronous model and object location update in the OT device. This means that an estimate of the currently observed location in a current frame can be determined using the most current but still delayed detection information from the OD server but corrected by the OT device to the currently observed position in the current frame.

Generally, location or position updates of objects from the OD server are more reliable than estimated locations tracked by the OT device. This means that in AR applications, detection information from an OD server should be used to correct the model and location of the object of interest in the OT device. Another characteristic is that the object tracking run at the OT device is fast, and is generally faster than real time. This means that the OT device can process several tens of or even several hundreds of frames per second without compromising the accuracy. Hence, the OT device can process a number of frames in terms of tracking locations of objects in these frames in the time window between output of consecutive frames of the video sequence.

An aspect of the embodiments relates to an OT device 2, see FIGS. 1,2 and 4. The OT device 2 is configured to determine a location of an object 20 in a current frame 10 of a video stream 15, at a point in time following output of a preceding frame 11 of the video stream 15 but preceding output of the current frame 10, by starting from a location of the object 20 determined by an OD server 5 for a previous frame 12 of the video stream 15 and recursively or iteratively track the location of the object 20 in frames 11 of the video stream following the previous frame 12 up to the current frame 10 and recursively or iteratively update a model of the object 20 up to a model of the object 20 associated with the current frame 10. Each model associated with a given frame of the video stream 15 comprises at least one object feature representation extracted from at least one frame of the video stream 15 preceding the given frame.

This means that the OT device 2, once it receives detection information from the OD server 5 comprising object location information of at least one object in a previous frame $I_{n-k}$ 12, it (re-)initiates the location of the at least one object in the previous frame $I_{n-k}$ 12 based on the received object location information. The OT device 2 furthermore runs an object tracking in the background by updating, frame-by-frame 11, the location of the object 20 and the model of the object 20 from the previous frame $I_{n-k}$ 12 up to the current frame $I_n$ 10. Thus, the OT device 2 may update the location and model of the at least one object 20 for frame $I_{n-k+1}$ following the previous frame $I_{n-k}$ 12, and then continues to update the location and model for the at least one object 20 for frame $I_{n-k+2}$ and so on until reaching the current frame $I_n$ 10. This object tracking from previous frame $I_{n-k}$ 12 up to the current frame $I_n$ 10 can run in the background and can be conducted until it is time to output the current frame $I_n$ 10 for display since the object tracking can be done faster than real time. As a consequence, the OT device 2 is able to determine the current location of the at least one object 20 in the current frame $I_n$ 10 starting from the detected location of the at least one object 20 in the previous frame $I_{n-k}$ and updating the location, frame-by-frame, in an object tracking until reaching the current frame $I_n$ 10. The current frame $I_n$ can then be augmented and output, for instance, for display together with the augmented information that is typically selected and positioned at least partly based on the determined location of the at least one object 20 in the current frame $I_n$ 10 and typically also the type of the at least one current object as received in the detection information from the OT server 5.

Thus, in an embodiment, see FIGS. 1, 2 and 4, the OT device 2 is configured to augment the current frame 10 with perceptual information based on the location of the object 20 in the current frame 10. The OT device 2 is also configured to output the augmented current frame 10.

Thus, by using the location of the at least one object determined by the OD server 5 for the previous frame 12 and recursively or iteratively update the location of the at least one object 20 in the subsequent frames 11 until reaching the current frame 10, the OT device 10 has access to an accurate location of the at least one object 20 in the current frame 10 and can thereby augment the current frame 10 with perceptual information based on the location of the at least one object 20.

In a particular embodiment, the OT device 2 is configured to augment the current frame 10 with the perceptual information based on the location of the object 20 in the current frame 10 and based on a type of the object determined by the OD server 5 for the previous frame 12.

For instance, the OT device 2 can select the type of perceptual information to augment the current frame 10 based on the type of the object 20. The location of the object 20 in the current frame 10 is then used by the OT device 2 to identify where the perceptual information should be included in the scene of the current frame 10.

Perceptual information as used herein relates to any information or data that could be used to augment a scene. Non-limiting, but illustrative, examples of such perceptual information includes name of a detected building, name of a detected person, etc.

In an embodiment, see FIGS. 1, 2 and 4, the OT device 2 is configured to recursively track the location of the object 20 by starting from the location of the object 20 determined by the OD server 5 for the previous frame 12 and track the location of the object 20, in each frame 11 of a set of frames 11 following the previous frame 12 and ordered in output order, based on a location of the object 20 in a preceding frame of the set or, for the first frame of the set, the location of the object 20 determined by the OD server 5, and a model of the object 20 associated with the video frame 11 of the set.

In an embodiment, this set of frames includes each frame 11 in the video stream 15 from the previous frame 12 up to the current frame 10. In this embodiment, the set of frames 11 thereby includes frames $I_{n-k+1}$ up to the current frame $I_n$, i.e., $I_{n-k+1}, I_{n-k+2}, \ldots, I_{n-1}, I_n$, wherein n, k are positive integers.

In another embodiment, the set of frames could include merely a sub-portion of the frames 11 from the previous frame 12 up to the current frame 10. For instance, the set could include every $m^{th}$ frame from the previous frame 12 up to the current frame 10. For m=2, the set could include frames $I_{n-k+2}, I_{n-k+4}, \ldots, I_{n-2}, I_n$.

In either case, the OT device 2 recursively tracks the location of the object 20 by starting from the location of the object 20 determined by the OT server 5 for the previous frame 12 and tracking the location of the object 20 in each frame 11 of the set. Since the frames are ordered in output order as shown in FIG. 2, this means that the location of the object 20 in, for instance, frame $I_{n-k+4}$ is determined by the OT device 2 based on the location of the object in a preceding frame of the set, i.e., $I_{n-k+4-m}$, and a model of the object 20 associated with the frame $I_{n-k+4}$, m≥1. For the first frame in the set, i.e. frame $I_{n-k+m}$, the tracking of the location of the object 20 is performed based on the location of the object as determined by the OD server 5 in the preceding frame $I_{n-k}$ 12. For subsequent frames 11 in the set, the tracking of the location of the object 20 is performed based on the tracked location of the object as determined by the OT device 2 for the preceding frame in the set.

In an embodiment, exemplified with reference to FIGS. 1, 2 and 4, the OT device 2 is configured to recursively update the model of the object 20, in each frame 11 of a set of frames 11 following the previous frame 12 and ordered in output order, based on the model associated with the frame 11 of the set and at least one object feature representation extracted from the frame 11 of the set.

Thus, let $M_p$ represent the model of the object 20 associated with frame $I_p$ in the set of frames, wherein p is a positive integer. This model $M_p$ comprises at least one object feature representation extracted from at least one frame of the video stream 15 preceding frame $I_p$. For instance, the model $M_p$ could comprise at least one object feature representation extracted from the next preceding frame $I_{p-m}$, i.e., $M_p=\{X_{p-m}\}$, wherein $X_{p-m}$ represents the at least one object feature representation extracted from the preceding frame $I_{p-m}$. In another example, the model $M_p$ could comprise at least one object feature representation extracted from T preceding frames $I_{p-m}, \ldots, I_{p-mT}$, i.e., $M=\{X_a\}_{a=p-m}^{p-mT}$ and T is an integer equal to or larger than two. In addition, or alternatively, the model $M_p$ could comprise at least one object feature representation extracted from an initial frame $I_0$ of the video stream.

In this embodiment, the OT device 2 thereby updates the model of the object 20 based on the model $M_p$ associated with frame $I_p$ and at least one object feature representation extracted from frame $I_p$ of the set, i.e., $M_{p+m}=g(M_p, X_p)$ for some function g( ). A non-limiting example of such a function g( ) could be ∪ denoting set unit, i.e., A∪B means the total set elements which are either in A or in B. As an example, if A={$X_1$, $X_2$} and B={$X_3$} the A∪B={$X_1$, $X_2$, $X_3$}. Hence, in an embodiment $M_{p+m}=M_p \cup X_p$.

Each model associated with a given frame of the video stream 15 comprises at least one object feature representation extracted from at least one frame of the video stream 15 preceding the given frame. One or more such object feature representations could be extracted from one or more preceding frames of the video stream 15. For instance, the model $M_n$ associated with the current frame $I_n$ 10 could include a respective object feature representation extracted from the T preceding frames $I_{n-1}, I_{n-2}, \ldots, I_{n-T}$ in the video stream 15 assuming that the above mentioned parameter m=1.

In an embodiment, see FIGS. 1, 2 and 4, the OT device 2 is configured to determine the location $B_n$ of the object 20 in the current frame $I_n$ 10 by recursively track the location of the object 20 and recursively update the model of the object 20 by, i=1 and m is a positive integer, and for each frame $I_{n-k+im}$ 11 of the video stream 15 until n-k+im=n, track the location $B_{n-k+im}$ of the object 20 in frame $I_{n-k+im}$ 11 based on the location $B_{n-k+(i-1)m}$ of the object 20 in frame $I_{n-k+(i-1)m}$ and a model $M_{n-k+im}$ of the object 20 associated with frame $I_{n-k+im}$ 11. In this embodiment, the location $B_{n-k}$ of the object 20 in frame $I_{n-k}$ 12 is determined by the OD server 5. The OT device 2 is also configured to increase i by one and update the model $M_{n-k+im}$ of the object 20 associated with frame $I_{n-k+im}$ 10 based on the model $M_{n-k+(i-1)m}$ of the object 20 associated with frame $I_{n-k+(i-1)m}$ and at least one object feature representation $X_{n-k+(i-1)m}$ extracted from frame $I_{n-k+(i-1)m}$ 10.

In an embodiment, the location of an object 20 in a frame 10, 12 is in the form of a bounding box representation for the object 20, see FIG. 4. The bounding box representation defines a coordinate for a bounding box enclosing the object 20 in the frame 10, 12 and a size of the bounding box.

The bounding box representation may, for instance, be in the form of a vector defining a coordinate of the bounding box and a size of the bounding box. The coordinate ($x_p$, $y_p$) could be any coordinate that allows identification of the position of the bounding box in a frame. The coordinate could, for example, represent the center of the bounding box or one of the corners of the bounding box. The size of the bounding box could be defined by a width ($w_p$) and a height ($h_p$) of the bounding box as an illustrative, but non-limiting, example. Hence, in an embodiment the bounding box representation could be in the form of $B_p=[x_p, y_p, w_p, h_p]$ for frame $I_p$. In an alternative embodiment, the bounding box representation could include coordinates of opposite corners of the bounding box, i.e., $B_p=[x1_p, y1_p, x2_p, y2_p]$.

In a general case, the object tracking performed by the OT device could therefore be defined by the mapping $B_p=f(I_p, M_p, B_{p-m})$ from a previous representation $B_{p-m}$, such as $B_{p-1}$, of a bounding box in a previous frame into the representation $B_p$ of the bonding box in frame $I_p$ given a model $M_p$ of the object associated with frame $I_p$.

Thus, let $B_p$ be the center and the size of the bounding box for the tracked object in frame $I_p$. It can be parametrized as coordinates of center ($x_p, y_p$), as well as width ($w_p$) and height ($h_p$), i.e. $B_p=[x_p, y_p, w_p, h_p]$. Let $M_p$ be the model used by the tracking algorithm for frame $I_p$. The model comprises, in an illustrative example, object feature representations X, extracted from the past T frames $M_p = \{X_a\}_{a=p-1}^{p-T}$. The object feature representations are extracted from the image regions corresponding to the object of interest, i.e., past locations of the objects determined by the set of previous bounding boxes. These object feature representations could be in the form of color histograms, or histogram of oriented gradients, or even a vector with raw pixels under the bounding box region. When the model $M_p$ is updated with a new object feature representation, typically the oldest object feature representations is removed from the set to maintain a pre-determined size of the model.

The process of object tracking is defined by the function $f(\,): B_p=f(I_p, M_p, B_{p-m})$, which maps previous coordinates of a bounding box $B_{p-m}$ to the coordinates $B_p$ corresponding to the current frame $I_n$. It could be described by the following operation:

$$B_p = \arg\max_{B^*,m} d(X_p(B^*), X_m)$$

Here d( ) is a similarity measure selected to evaluate closeness of the object feature representations. $X_m$ is a target object feature representation belonging to the model M. $X_p(B^*)$ is a object feature representation corresponding to frame $I_p$ and extracted from location $B^*$. In other words the mapping $f(\,)$ searches for the best match between object feature representations extracted from different locations in the current frame, and the closest object feature representation from the existing model.

The similarity measure could be for example normalized cross-correlation $$B_p = \arg\max_{B^*,m} R(X_p(B^*), X_m)$$

or any inverse of a distance metrics, for example Euclidean distance with negative sign, $$B_p = \arg\max_{B^*,m} (-\|X_p(B^*) - X_m\|).$$

Thus, a typical implementation of the object tracking would be to start from the same coordinate and size of the bounding box in a frame $I_p$ as the bounding box in a previous frame $I_{p-m}$, preferably the most previous frame $I_{p-1}$, which is schematically illustrated by the dotted box in FIG. 3. Object feature representations are then extracted from this initial location of the bounding box and compared to the object feature representations from the model. Further locations of the bounding box are then tested in frame $I_p$, and for each such new location of the bounding box, object feature representations are extracted from the new location of the bounding box and compared to the object feature representations from the model. Then the location of the bounding box resulting the largest similarity measure is selected as the location of the tracked object in frame $I_p$.

The particular type of object feature representations of the model depends on the type of object tracking algorithm that the OT device uses. For example, an object tracking algorithm could use color histograms of objects. In such a case, the object feature representations could be calculated as cluster centroids of color histograms. Further examples include object feature representations based on Histogram of Oriented Gradients (HOG) features, Speeded Up Robust Features (SURF), Local Binary Patterns (LBP), or indeed any other color, texture and/or shape descriptors.

In a particular embodiment, the object feature representations are feature vectors for the objects. In such a particular embodiment, the feature vectors could be represented by a mean or average feature vector and its variance.

In an embodiment, with reference to FIGS. 1, 2 and 4, the OT device 2 is configured to determine the location $B_{n-k+im}$ of the object 20 in frame $I_{n-k+im}$ 11 based on $$B_{n-k+im} = \arg\max_{B^*,m} d(X_{n-k+im}(B^*), X_m).$$

In this embodiment, $B_{n-k+im}$ indicates a bounding box representation for the object 20, d( ) indicates a similarity measure representing a similarity between object feature representations, $X_m$ indicates an object feature representation belonging to the model $M_{n-k+im}$ of the object 20 associated with frame $I_{n-k+im}$ 11, and $X_n(B^*)$ indicates an object feature representation extracted from location B* in frame $I_{n-k+im}$ 11. The bounding box representation defines a coordinate for a bounding box enclosing the object 20 in frame $I_{n-k+im}$ 11 and a size of the bounding box.

In an embodiment, the OT device is configured to perform the following processing operations on a frame-by-frame basis. For the sake of notation let us assume we have to currently process and visualize frame $I_n$ as shown in FIG. 2. When processing and visualizing the current frame $I_n$, there are two options. In a first option or case, no detection information is available from the OD server and only past object tracking information can be used. In a second option or case, such a detection information has arrived from the OD server.

Option 1—no detection information from OD server is available, see FIG. 3.

The OT device then propagates the tracked object position to the next frame $I_n$ 10 and updates the model by incorporating object feature representation from the last available frame $I_{n-1}$ 11.

$$B_n = f(I_n, M_n, B_{n-1})$$

$$M_{n+1} = M_n \cup X_n$$

This option 1 corresponds to traditional object tracking, in which the OT device tracks the location $B_n$ of an object 20 in a current frame $I_n$ 10 based on the location $B_{n-1}$ of the object 20 in the preceding frame $I_{n-1}$ 11 and the model $M_n$ of the object 20 associated with the current frame $I_n$ 10, i.e., $B_n=f(I_n, M_n, B_{n-1})$. The OT device also updated the model $M_{n+1}$ to a state ready for tracking the location $B_{n+1}$ of the object in the next frame $I_{n+1}$ 10 of the video stream 15.

Option 2—detection information from OD server is available, see FIG. 4.

In a preferred embodiment, the OT server reverses the model $M_n$ of the object to a state corresponding to the model $M_{n-k}$ associated with the previous frame $I_{n-k}$ 12 that was previously sent to the OD server for object detection. This model or state reversal can be performed by removing object feature representations $X_{n-1}$ to $X_{n-k+1}$ from the model $M_n$, i.e., clean the recent memory reversing the model back to $M_{n-k}$. The OT device is then preferably configured to propagate the detected object position from the scene in frame $I_{n-k}$ 12 to the current frame $I_n$ 10 and recursively or iteratively update the model.

$$B_{n-k+1}=f(I_{n-k+1},M_{n-k+1},B_{n-k})$$

$$M_{n-k+2}=M_{n-k+1}\cup X_{n-k+1}$$

$$B_{n-k+2}=f(I_{n-k+2},M_{n-k+2},B_{n-k+1})$$

$$M_{n-k+3}=M_{n-k+2}\cup X_{n-k+2}$$

...

$$B_n=f(I_n,M_n,B_{n-1})$$

$$M_{n+1}=M_n\cup X_n$$

In an embodiment, the OT device is configured to operate according to option 2 if it has access to detection information from the OT server. In another embodiment, the OT device first performs a check or investigation whether the OT device has sufficient processing time to operate according to option 2 before initiating the processing. In this embodiment, the parameter $\theta$ represents the number of frames that the OT device can process in terms of tracking the location of an object and update the model of the object during the period of time between output of the preceding frame $I_{n-1}$ of the video stream and output of the current frame $I_n$. In such a case, the OT device is configured to perform processing according to option 2 above if $k \leq \theta$, i.e., the number of frames that the OT device needs to process in the recursive location tracking according to option 2 is not larger than the maximum number of frames that the OT device can process during the available time window until the current frame $I_n$ needs to be output, such as for display.

In this embodiment, if $k>\theta$, then the OT device could operate according to option 3.

Option 3—detection information from OD server is available but $k>\theta$

In this case, the OT device cannot process, in real time, all frames from the previous frame $I_{n-k}$ up to the current frame $I_n$. A solution to this problem could be that the iteration from frame $I_{n-k}$ to frame $I_n$ is not done on the entire set of intermediate frames. In clear contrast, the set of frames that are processed by the OT device does not need to include all intermediate frames of the video stream but merely a portion thereof. For example, the set could include every second frame, every third frame, or more generally every $m^{th}$ of the intermediate frames from frame $I_{n-k}$ to frame $I_n$. In such a case, the tracking complexity is thereby reduced by a factor of two, a factor of three, or a factor of m.

Hence, in an embodiment, see FIGS. 1, 2 and 4, the OT device 2 is configured to compare the parameter k with a parameter $\theta$ representing the number of frames that the OT device 2 can process in terms of tracking the location of an object 20 and update the model of the object 20 during the period of time between output of the preceding frame 11 of the video stream 15 and output of the current frame 10. The OT device 2 is also configured to determine the location of the object 20 in the current frame 10 by recursively track the location of the object 20 in frames 11 of the video stream 15 and recursively update the model of the object 20 if $k \leq \theta$.

This embodiment thereby guarantees that the OT device 2 is able to determine location of the object 20 in the current frame 10 by starting from the location determined by the OD server 5 for the previous frame 12 and recursively track the location of the object 20 in frames 11 of the set of intermediate frames 11 up to the current frame 10 before the current frame 10 needs to be output for display.

In an embodiment, see FIGS. 1, 2 and 4, the OT device 2 is configured to determine a value of the parameter m to be equal to one if $k \leq \theta$ and otherwise determine the value of the parameter m to be equal to an integer value equal to or larger than two.

In an embodiment, see FIGS. 1, 2 and 4, the OT device 2 is configured to determine a value of the parameter m based on at least one of a processing power available for the OT device 2 and a battery capacity of a battery configured to provide power to the OT device 2.

The parameter m defines the number and which intermediate frames from frame $I_{n-k}$ up to frame $I_n$ to include in the recursive location tracking and model update. For instance, m=1, every intermediate frame is included in the recursive location tracking by the OT device 2. For values of the parameter m larger than one, the set of frames merely includes a portion of the intermediate frames and thereby requires less processing as compared to the processing done by the OT device 2 for a lower value of the parameter m. In other words, a recursive tracking of object location and model update will be less computational expensive for the OT device 2 the higher the value of the parameter m.

Generally, the accuracy of the object tracking improves if the OT device 2 processes each and every frame from frame $I_{n-k}$ up to frame $I_n$. Correspondingly, a higher value of the parameter m implies that there will be larger "gaps" between frames in the recursive object tracking. Such larger gaps, however, may as a consequence lead to a less accurate object tracking and a larger risk that the OT device 2 incorrectly tracks and determines the location of the object in the frames of the set.

In an embodiment, the value of this parameter m is determined based on at least one of the processing power available for the OT device 2 and the battery capacity configured to provide power to the OT device 2. For instance, an OT device 2 having access to comparatively more processing power than another OT device 2 could have a lower value of the parameter m. Correspondingly, an OT device 2 having access to more battery capacity than another OT device 2 could have a lower value of the parameter m.

Hence, OT devices 2 having access to high processing power and/or high battery capacity could use a low value of the parameter m and thereby perform a more accurate object tracking as compared to OT devices 2 having access to lower processing power and/or lower battery capacity and are thereby limited to use a higher value of the parameter m.

In an embodiment, see FIGS. 1, 2 and 4, the OT device 2 configured to receive, from the OD server 5, information of the location of the object 20 determined by the OD server 5 for the previous frame 12 and a timestamp associated with the previous frame 12. The OT device 2 is also configured to identify the previous frame 12 based on the timestamp received from the OD server 5.

The detection information from the OD server 5 thereby preferably comprises a timestamp of the previous frame 12 enabling the OT device 2 to identify this previous frame 12 in the video stream 15. The timestamp can be any type of information that enables identification of the previous frame 12. For instance, the timestamp could be a frame identifier or frame number. A further example could be an offset of the position of the previous frame 12 in the video stream 15 from the start of the video stream 15.

In an embodiment, see FIGS. 1, 2 and 4, the OT device 2 is configured to remove object feature representations from the model of the object 20 associated with the current frame 10 to obtain a model of the object 20 associated with the previous frame 12.

In this embodiment, the OT device 2 starts from the current state of the model $M_n$ associated with the current frame $I_n$ 10 and then recreates or reverses the state of the model $M_{n-k}$ as associated with the preceding frame $I_{n-k}$ 12 by removing object feature representations from the model $M_n$ to obtain the model $M_{n-k}$. In an embodiment, the model $M_n$ is preferably reversed by removing object feature representations previously extracted from the intermediate frames from frame $I_{n-1}$ to frame $I_{n-k+1}$, i.e., removes object feature representations $X_{n-1}$ to $X_{n-k+1}$ from the model $M_n$.

The OT device 2 thereby, following the reversal of the model, has access to a model $M_{n-k}$ that can be used for the recursive object tracking from the previous frame $I_{n-k}$.

In an embodiment, see FIGS. 1, 2 and 4, the OT device 2 is configured to determine, at the point in time following output of the preceding frame 11 but preceding output of the current frame 10, whether the OT device 2 has received, from the OD server 5, information of the location of the object 20 determined by the OD server 5 for the previous frame 12. The OT device 2 is also configured to determine the location of the object 20 in the current frame 10 by recursively track the location of the object 20 in frames 11 of the video stream 15 and recursively update the model of the object 20 if the OT device 2 has received the information from the OD server 5.

In this embodiment, the OT device 2 first verifies that it has received the detection information from the OD server 5 relating to the previous frame 12.

In an embodiment, see FIGS. 1, 2 and 4, the OT device 2 is configured to determine the location of the object 20 in the current frame 10 based on a location of the object 20 determined by the OT device 2 for the preceding frame 11 and the model of the object 20 associated with the current frame 10 if the OT device 2 has not received the information from the OD server 5.

In other words, if the OT device 2 has received the detection information from the OD server 5, i.e., option 2 or 3 as previously described herein, the OT device 2 should use this detection information since the location information included therein is generally more accurate than location information determined solely in an object tracking by the OT device 2. However, if the OT device 2 has not received the detection information from the OD server 5, i.e., option 1 as previously described herein, the OT device performs a pure object tracking by determining the location of the object in the current frame 10 based on the location of the object 20 determined by the OT device 2 for the preceding frame 11 and the model of the object 20 associated with the current frame 10, i.e., $B_n = f(I_n, M_n, B_{n-1})$.

In an embodiment, see FIGS. 1, 2 and 4, the current frame 10 comprises multiple objects 20. The OT device 2 is configured to determine, for each object 20 of the multiple objects 20, a similarity between the location of the object 20 determined by the OD server 5 for the previous frame 12 and a location of the object 20 determined by the OT device 2 for the preceding frame 11. The OT server 2 is also configured to determine, in an order defined based on the determined similarities starting with an object 20 of the multiple objects 20 having the lowest similarity, the location of the object 20 in the current frame 10 by recursively track the location of the object 20 in frames 11 of the video stream 15 and recursively update the model of the object 20.

Thus, if there are multiple objects, the OT device 2 could sort these multiple objects based on determined similarities and then perform the recursive object tracking according to the sorted order. In such a case, the recursive object tracking is preferably initiated for the object having the lowest determined similarity, preceding to the object with the next lowest determined similarity, and so on. A low determined similarity implies that there is a large difference between the location $B_{n-k}$ of the object 20 as determined by the OD server 5 for the previous frame $I_{n-k}$ 12 and the location $B_{n-1}$ of the object 20 as determined by the OT device 2 for the preceding frame $I_{n-1}$ 11. Hence, the object 20 has moved or changed between the previous frame $I_{n-k}$ 12 and the preceding frame $I_{n-1}$ 11. Correspondingly, a high determined similarity implies that the location of the object 20 is substantially constant over frames and thereby has not changed much from the previous frame $I_{n-k}$ 12 up to the preceding frame $I_{n-1}$ 11.

Performing the recursive object tracking in the reverse order with regard to similarity (from low similarity to high similarity) implies that the recursive object tracking is started with those objects that have moved or changed most and thereby for which there is larger risk that the OT device 2 will fail to accurately track. Correspondingly, objects having a high similarity are objects that have not moved or changed much over frames and thereby easier for the OT device 2 to accurately track.

This order of recursive object tracking objects implies that the OT device 2 should start with the object(s) for which the object tracking is most likely to fail or be inaccurate. This means, in particular given a limited processing time for the recursive object tracking until the current frame 10 should be output, that the OT device 2 has time to at least determine the location for the objects with lowest tracking accuracy using the more accurate recursive object tracking whereas objects with higher tracking accuracy could instead be tracked using the less accurate object tracking without use of any detection information from the OD server 5 if there is not sufficient time to track all of the multiple objects using the more accurate recursive object tracking.

The similarity between locations of the objects in different frames could be determined in any way representing a distance between locations. Non-limiting, but illustrative, examples include calculating intersection over union (IoU) between bounding boxes in the two frames, or calculating the distances between centers or corners of the bounding boxes.

Thus, in a case of multiple object tracking (MOT) and when detection information from the OD server 5 is available at the OT device 2, a level of synchronization may be calculated between the bounding box $B_{n-k}$ received from the OD server 5 and the last predicted bounding box $B_{n-1}$ from the OT device 2. This may be done by calculating, for instance, IoU between the two bounding boxes IoU($B_{n-k}$, $B_{n-1}$) as similarity measure. The value of the similarity measure will approach one if the prediction from the OT device 2 for the preceding frame $I_{n-1}$ and prediction from the OD server 5 for the previous frame $I_{n-k}$ k frames back point at the same frame region. This may happen if, for example, the object is stationary, or if the object is moving slowly and detection update from the OD server 5 is very recent. The IoU value will approach zero if prediction from the OT device 2 differs significantly from the prediction from the OD server 5.

In an embodiment, all objects are sorted in ascending order with regard to IoU value, and optionally based on the complexity requirements, only N objects from the top of the list are updated according to the recursive object tracking, for instance according to option 2 or 3. This means that mainly objects with larger disagreement between the OT device 2 and the OD device 5 get updated model and positions, according to the recursive procedure (option 2 or 3). The objects from the bottom of the list are preferably updated according to option 1, e.g., according to below:

$$B_n = f(I_n, M_{n-k}, B_{n-k})$$

$$M_{n+1} = M_n \cup X_n$$

If the bounding box $B_{n-k}$ received from the OD server 5 is very close to the last estimate from the OT device 2, $B_{n-1}$, the IoU value is high. The model $M_{n+1}$ is created by adding the last available object feature representation $X_n$, to the last available to the model $M_n$. In reality there should be very little difference in the information content of the model $M_n$ and the model available at the scene origin $M_{n-k}$, so optionally, this model $M_{n-k}$ could be used instead of the model $M_n$ in the update of $M_{n+1}$ according to above, i.e., $M_{n+1} = M_{n-k} \cup X_n$.

In an embodiment, the current frame 10 comprises multiple objects 20, see FIGS. 1, 2 and 4. The OT device 2 is configured to determine, for each object 20 of the multiple objects 20, a similarity between the location of the object 20 determined by the OD server 5 for the previous frame 12 and a location of the object 20 determined by the OT device 2 for the preceding frame 11. The OT device 2 is also configured to determine, for an object 20 of the multiple objects 20, the location of the object 20 in the current frame by recursively track the location of the object 20 in frames 11 of the video stream 15 and recursively update the model of the object 20 if the similarity determined for the object 20 is below a minimum similarity.

In this embodiment, the OT device 2 determines a respective similarity for each object as previously described herein, such as in the form of a respective IoU value. The OT device 2 then compares, for a given object of the multiple objects, its similarity with a minimum similarity, also referred to as similarity threshold herein. If the similarity determined for the object is below the minimum similarity, i.e., there is a low similarity between the location of the object determined by the OD server 5 for the previous frame $I_{n-k}$ and the location of the object determined by the OT device 2 for the preceding frame $I_{n-1}$, then the OT device 2 preferably determines the location of the object by the recursive location tracking (option 2 or 3).

In an embodiment, see FIGS. 1, 2 and 4, the OT device 2 is configured to determine, for an object 20 of the multiple objects 20, the location of the object 20 in the current frame 10 based on a location of the object 20 determined by the OT device 2 for the preceding frame 11 and the model of the object 20 associated with the current frame 10 if the similarity determined for the object 20 is equal to or exceeds the minimum similarity.

Hence, in an embodiment, the OT device 2 is configured to determine the location of the object according to option 2 or 3 above if the similarity is below the minimum similarity but instead determines the location of the object according to option 1 if the similarity is equal to or exceeds the minimum similarity.

This means that the more complex but also more accurate recursive object tracking is used for object(s) that has(have) largest need for a more accurate tracking. However, the less complex object tracking according to option 1 can be used for stationary objects. The comparatively less accuracy of this option 1 is generally not a problem since the object(s) has(have) not moved much over frames and the OT device 2 can thereby more accurately track the location(s) of the object(s).

There are various object detection algorithms available in the art, and that can be used by the OD server to determine the location, such as DPM with HOG features, CNNs, etc. Non-limiting, but illustrative, examples of such object detection algorithms are disclosed in Ren et al., Faster R-CNN: Towards Real-Time Object Detection with Region Proposal Networks, *IEEE Transactions on Pattern Analysis and Machine Intelligence*, 2017, 39(6): 1137-1149; Redmon and Farhadi, YOLO9000: Better, Faster, Stronger, *IEEE Conference on Computer Vision and Pattern Recognition (CVPR)*, 2017; Viola and Jones, Rapid Object Detection using a Boosted Cascade of Simple Features, *Proceedings of the 2001 IEEE Computer Society Conference on Computer Vision and Pattern Recognition, 2001. (CVPR 2001)*, 2001.

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 6:
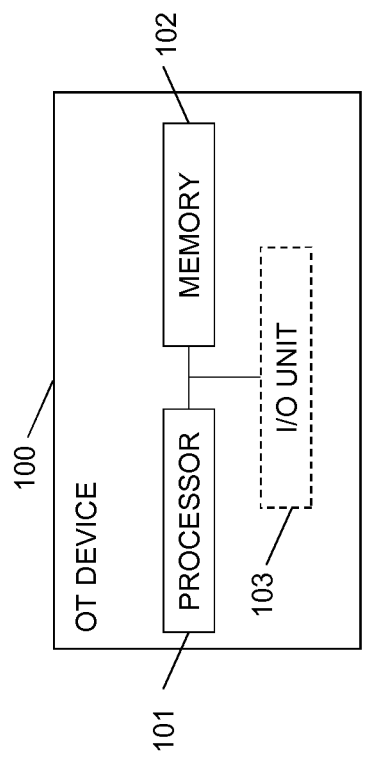
FIG. 6 is a block diagram of an object tracking device according to an embodiment.

FIG. 6 is a schematic block diagram illustrating an example of an OT device 100 according to an embodiment. In this particular example, the OT device 100 comprises a processor 101, such as processing circuitry, and a memory 102. The memory 102 comprises instructions executable by the processor 101.

In an embodiment, the processor 101 is operative to determine the location of the object in the current frame by recursively track the location of the object in frames of the video stream and recursively update the model of the object.

Optionally, the OT device 100 may also include a communication circuit, represented by a respective input/output (I/O) unit 103 in FIG. 6. The I/O unit 103 may include functions for wired and/or wireless communication with other devices, servers and/or network nodes in a wired or wireless communication network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, I/O circuitry, input port(s) and/or output port(s).

Figure 7:
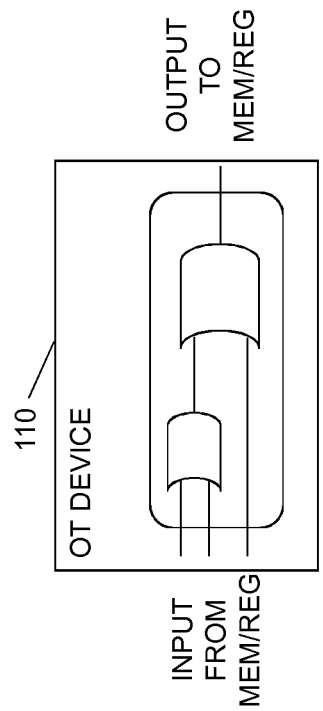
FIG. 7 is a block diagram of an object tracking device according to another embodiment.

FIG. 7 is a schematic block diagram illustrating another example of an OT device 110 based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 8:
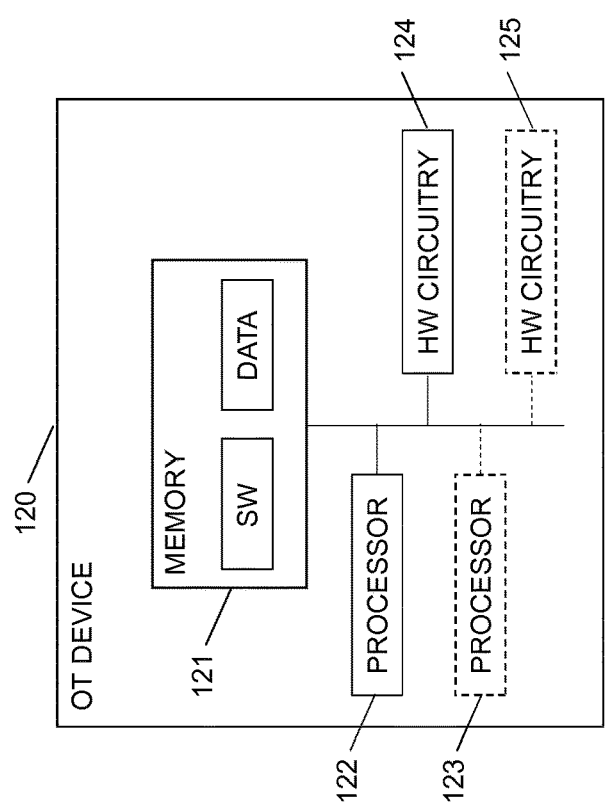
FIG. 8 is a block diagram of an object tracking device according to a further embodiment.

FIG. 8 is a schematic block diagram illustrating yet another example of an OT device 120 based on combination of both processor(s) 122, 123 and hardware circuitry 124, 125 in connection with suitable memory unit(s) 121. The overall functionality is, thus, partitioned between programmed software for execution on one or more processors 122, 123 and one or more pre-configured or possibly reconfigurable hardware circuits 124, 125. The actual hardware-software partitioning can be decided by a system designer based on a number of factors including processing speed, cost of implementation and other requirements.

Figure 9:
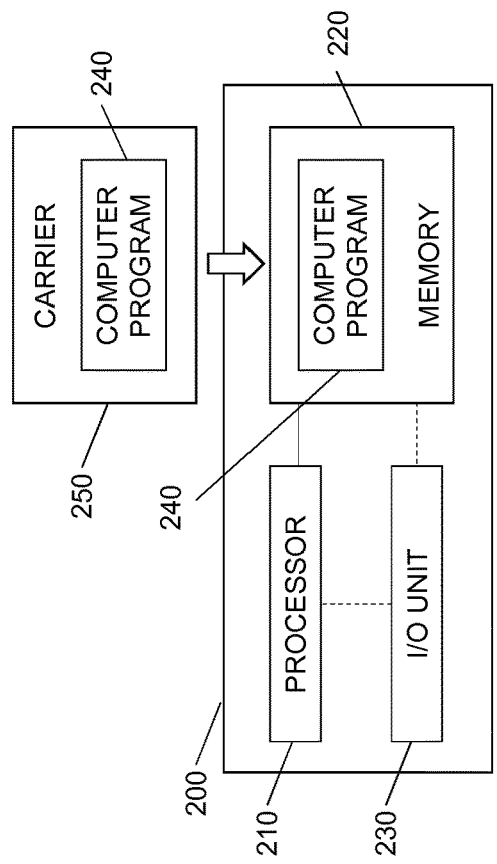
FIG. 9 schematically illustrate a computer program based implementation of an embodiment.

FIG. 9 is a computer program based implementation of an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as video frames and detection information.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by at least one processor 210, cause the at least one processor 210 to determine a location of an object in a current frame of a video stream, at a point in time following output of a preceding frame of the video stream but preceding output of the current frame, by starting from a location of the object determined by an OD server for a previous frame of the video stream and recursively track the location of the object in frames of the video stream following the previous frame up to the current frame and recursively update a model of the object up to a model of the object associated with the current frame. Each model associated with a given frame of the video stream comprises at least one object feature representation extracted from at least one frame of the video stream preceding the given frame.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium.

The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may, thus, be loaded into the operating memory 220 for execution by the processing circuitry 210.

The flow diagram or diagrams presented herein may be regarded as a computer flow diagram or diagrams, when performed by one or more processors. A corresponding OT device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 10:
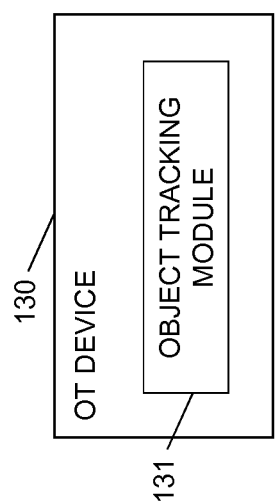
FIG. 10 is a block diagram of an object tracking device according to yet another embodiment.

FIG. 10 is a block diagram of an OT device 130 comprising an object tracking module 131 for determining a location of an object in a current frame of a video stream, at a point in time following output of a preceding frame of the video stream but preceding output of the current frame, by starting from a location of the object determined by an object-detection server for a previous frame of the video stream and recursively track the location of the object in frames of the video stream following the previous frame up to the current frame and recursively update a model of the object up to a model of the object associated with the current frame. Each model associated with a given frame of the video stream comprises at least one object feature representation extracted from at least one frame of the video stream preceding the given frame.

Another aspect of the embodiments defines a wireless device 1, see FIG. 5. The wireless device 1 comprises an OT device 2 according to the embodiments. The wireless device 1 also comprises a camera 3 configured to record video and generate a video stream. The wireless device 1 further comprises a transmitter 4 configured to transmit frames of the video stream to an OD server and a receiver 4 configured to receive information of a respective location of an object determined by the OD server for the frames.

The wireless device 1 may have a transmitter (TX) 4 and a receiver (RX) 4, or the transmitting and receiving functionalities can be implemented in a combined transceiver as schematically illustrated in FIG. 5. Transmitter and receiver 4 as used herein include any device, module and/or functionality that can be used by the wireless device 1 to transmit and receive data, respectively, regardless of whether the data communication is performed wirelessly or using wired connections.

Transmission of frames of the video stream by the transmitter 4 could be in the form of transmitting individual frames extracted from the video stream, such as transmitting a single frame, several individual frames or a range of successive frames extracted from the video stream generated by the camera 3. These frames could be transmitted in an uncoded or uncompressed format, or as encoded or compressed frames. Alternatively, the transmitter 4 could transmit or rather stream the video recorded by the camera 3 to the OD server, i.e., does not necessarily have to extract and transmit frames from the video stream. The video streamed by the transmitter 4 to the OD server could be in uncoded or uncompressed format, or as an encoded or compressed video stream.

In an embodiment, the wireless device 1 is a user device capable of providing augmented reality services, i.e., comprises the OT device according to any of the embodiments. The user device is advantageously selected from the group consisting of a mobile telephone, a cellular phone, a smart phone, a Personal Digital Assistant (PDA) equipped with radio communication capabilities, a laptop or a computer equipped with an internal or external mobile broadband modem, a tablet with radio communication capabilities, a game console, a head mounted display and augmented reality glasses.

The wireless device 1 does not necessarily have to be a user device capable of providing augmented reality services. Other examples of wireless devices 1 comprising an OT device 2 according to the embodiments include Internet of Things (IoT) devices, such as selected from the group consisting of a drone, a moving robot and a self-driving vehicle. Further examples of wireless devices include a target device, a Machine-to-Machine (M2M) device, a Machine Type Communication (MTC) device, a Device-to-Device (D2D) user equipment (UE), a machine type UE or UE capable of machine to machine communication, Customer Premises Equipment (CPE), Laptop Embedded Equipment (LEE), Laptop Mounted Equipment (LME), USB dongle, a portable electronic radio communication device, and/or a sensor device, meter, vehicle, household appliance, medical appliance, camera, television, radio, lightning arrangement and so forth equipped with radio communication capabilities or the like.

In a particular embodiment, the wireless device 1 is a wireless communication device. The term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

It is also becoming increasingly popular to provide computing services (hardware and/or software) in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources, such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and NIC(s), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a sets of applications. In an example embodiment, each of the software containers, also called virtualization engines, virtual private servers, or jails, is a user space instance, typically a virtual memory space. These user space instances may be separate from each other and separate from the kernel space in which the operating system is executed. Then, the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, network devices, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level. It should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device. In certain embodiments of such a hybrid network device, a platform Virtual Machine (VM), such as a VM that implements functionality of a special-purpose network device, could provide for para-virtualization to the hardware present in the hybrid network device.

Figure 11:
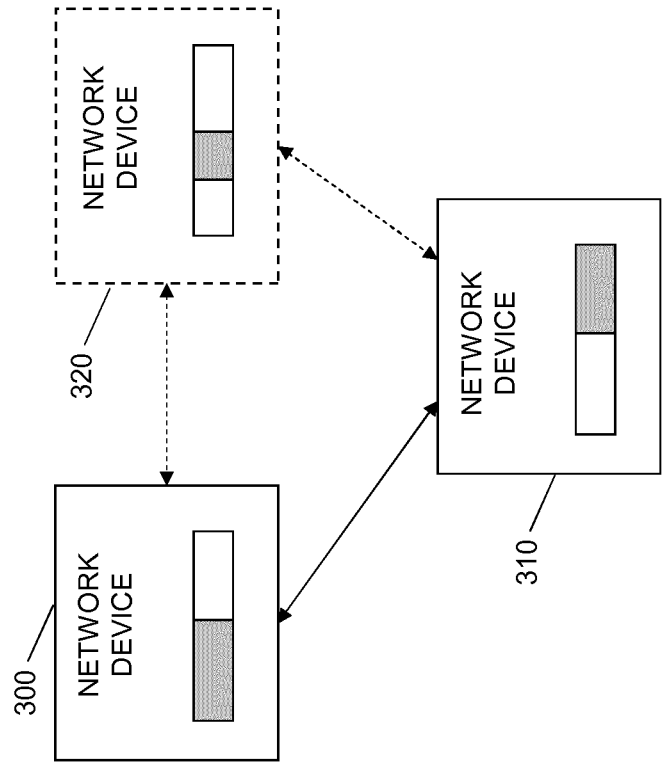
FIG. 11 schematically illustrates a distributed implementation among network devices.

FIG. 11 is a schematic diagram illustrating an example of how functionality can be distributed or partitioned between different network devices in a general case. In this example, there are at least two individual, but interconnected network devices 300, 310, which may have different functionalities, or parts of the same functionality, partitioned between the network devices 300, 310. There may be additional network device 320 being part of such a distributed implementation. The network devices 300, 310, 320 may be part of the same wireless or wired communication system, or one or more of the network devices may be so-called cloud-based network devices located outside of the wireless or wired communication system.

As used herein, the term "network device" may refer to any device located in connection with a communication network, including but not limited to devices in access networks, core networks and similar network structures. The term network device may also encompass cloud-based network devices.

Figure 12:
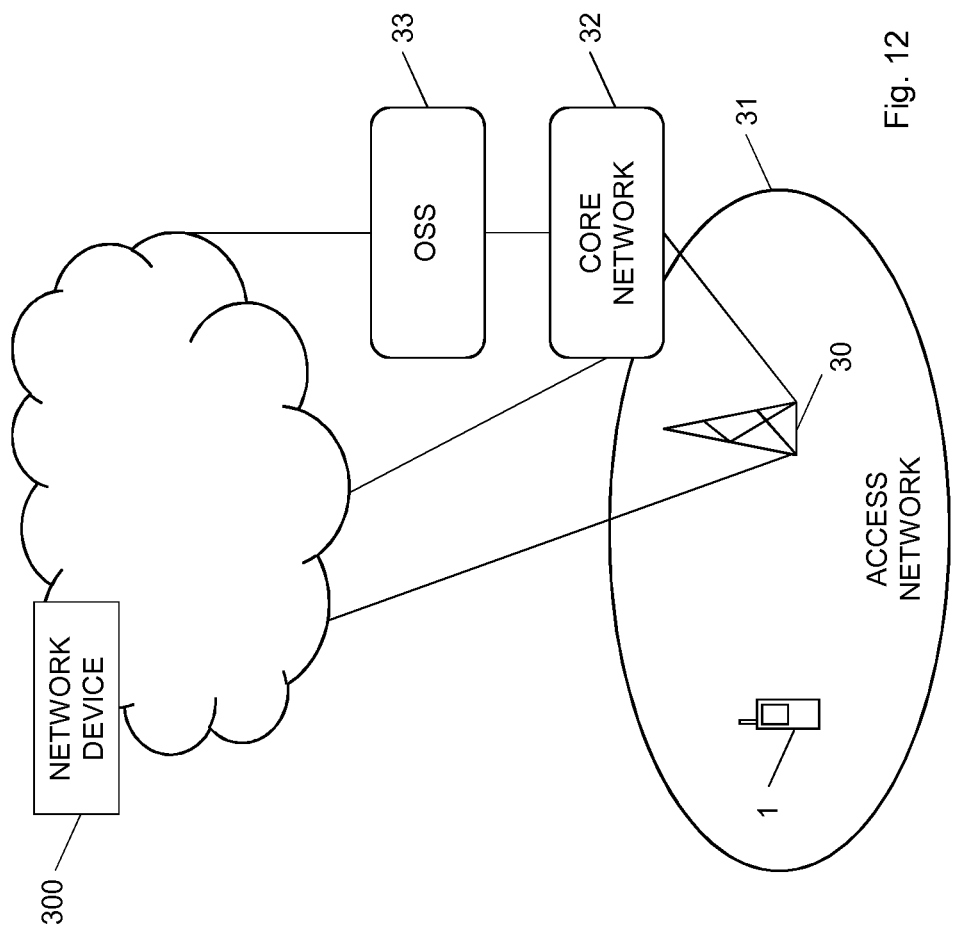
FIG. 12 is a schematic illustration of an example of a wireless communication system with one or more cloud-based network devices according to an embodiment.

FIG. 12 is a schematic diagram illustrating an example of a wireless communication system, including a radio access network (RAN) 31 and a core network 32 and optionally an operations and support system (OSS) 33 in cooperation with one or more cloud-based network devices 300. The figure also illustrates a wireless device 1 connected to the RAN 31 and capable of conducting wireless communication with a RAN node 30, such as a network node, a base station, node B (NB), evolved node B (eNB), next generation node B (gNB), etc.

In particular, the proposed technology may be applied to specific applications and communication scenarios including providing various services within wireless networks, including so-called Over-the-Top (OTT) services. For example, the proposed technology enables and/or includes transfer and/or transmission and/or reception of relevant user data and/or control data in wireless communications.

In the following, a set of illustrative non-limiting examples will now be described with reference to FIGS. 13 to 17.

Figure 13:
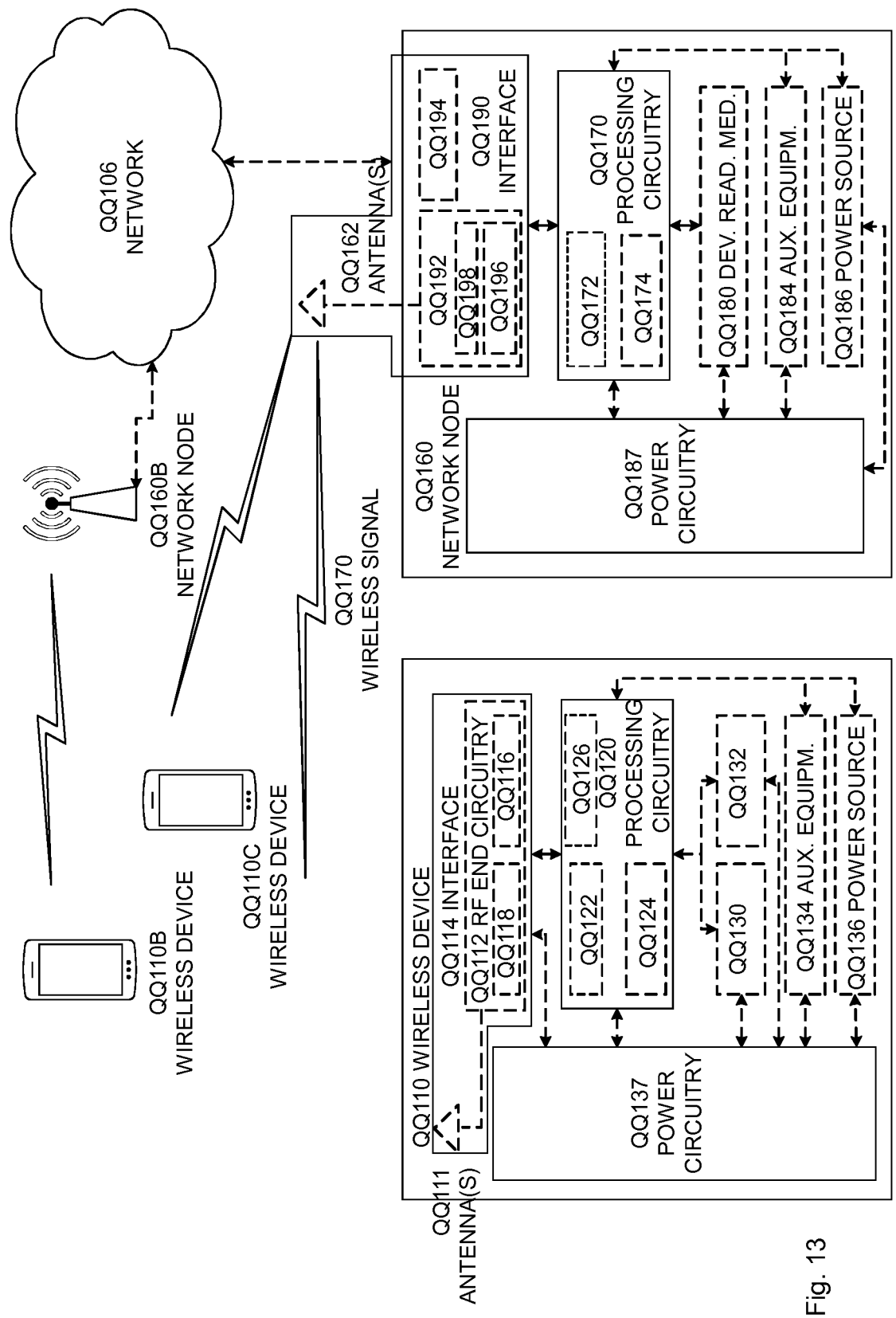
FIG. 13 is a schematic diagram illustrating an example of a wireless network in accordance with some embodiments.

FIG. 13 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network QQ106, network nodes QQ160 and QQ160B, and wireless devices (WDs) QQ110, QQ101B, and QQ110C. In practice, a wireless network may further include any additional elements suitable to support communication between wireless devices or between a wireless device and another communication device, such as a landline telephone, a service provider, or any other network node or end device. Of the illustrated components, network node QQ160 and WD QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, "network node" refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment, such as MSR BSs, network controllers, such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 13 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 14:
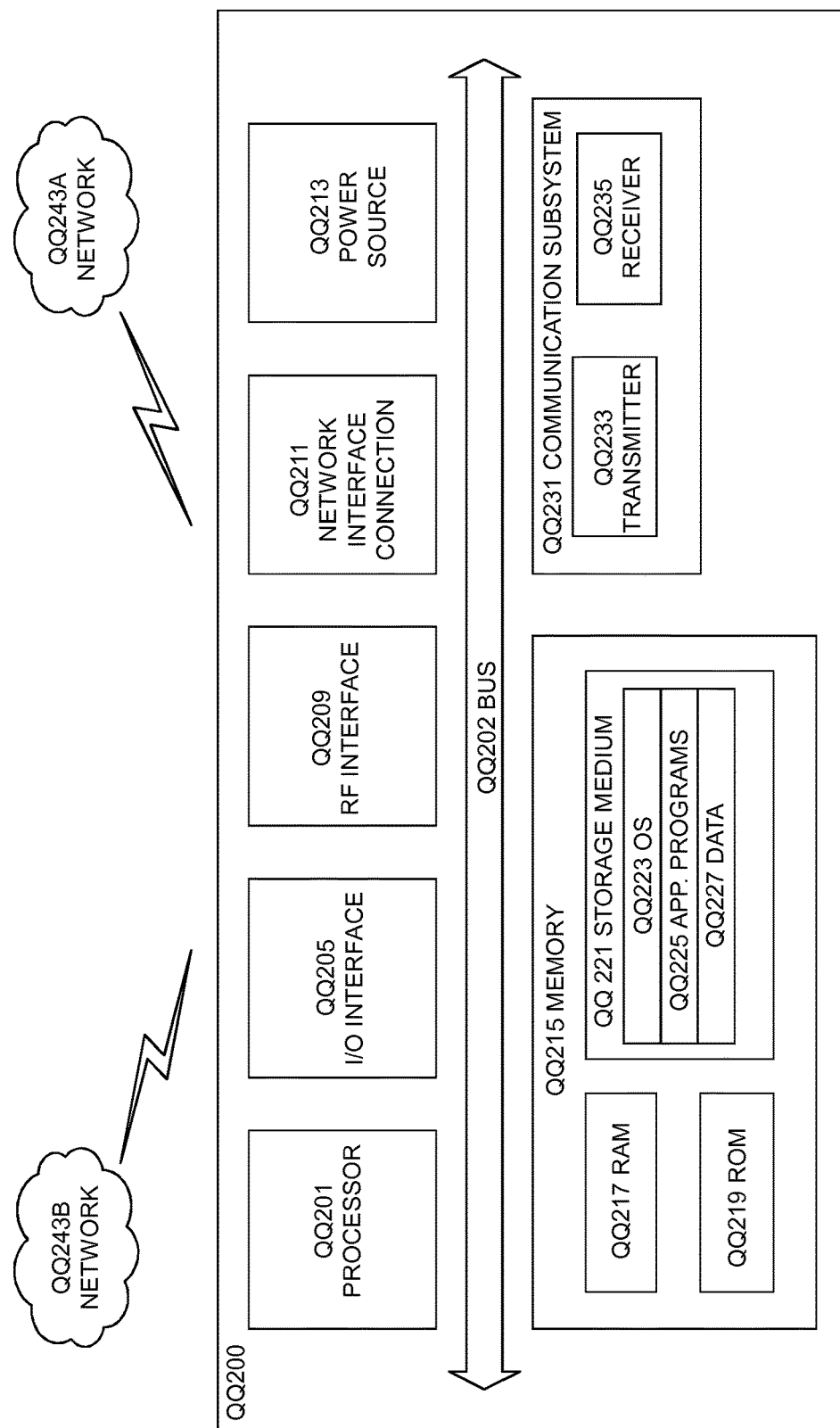
FIG. 14 is a schematic diagram illustrating an example of an embodiment of a wireless device in accordance with some embodiments.

FIG. 14 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. K, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ213, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface QQ209 may be configured to provide a communication interface to RF components such as a transmitter, a receiver, and an antenna. Network connection interface QQ211 may be configured to provide a communication interface to network QQ243A. Network QQ243A may encompass wired and/or wireless networks such as a local-area network (LAN), a wide-area network (WAN), a computer network, a wireless network, a telecommunications network, another like network or any combination thereof. For example, network QQ243A may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 14, processing circuitry QQ201 may be configured to communicate with network QQ243B using communication subsystem QQ231. Network QQ243A and network QQ243B may be the same network or networks or different network or networks. Communication subsystem QQ231 may be configured to include one or more transceivers used to communicate with network QQ243B. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243B may encompass wired and/or wireless networks such as a local-area network (LAN), a wide-area network (WAN), a computer network, a wireless network, a telecommunications network, another like network or any combination thereof. For example, network QQ243B may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 15:
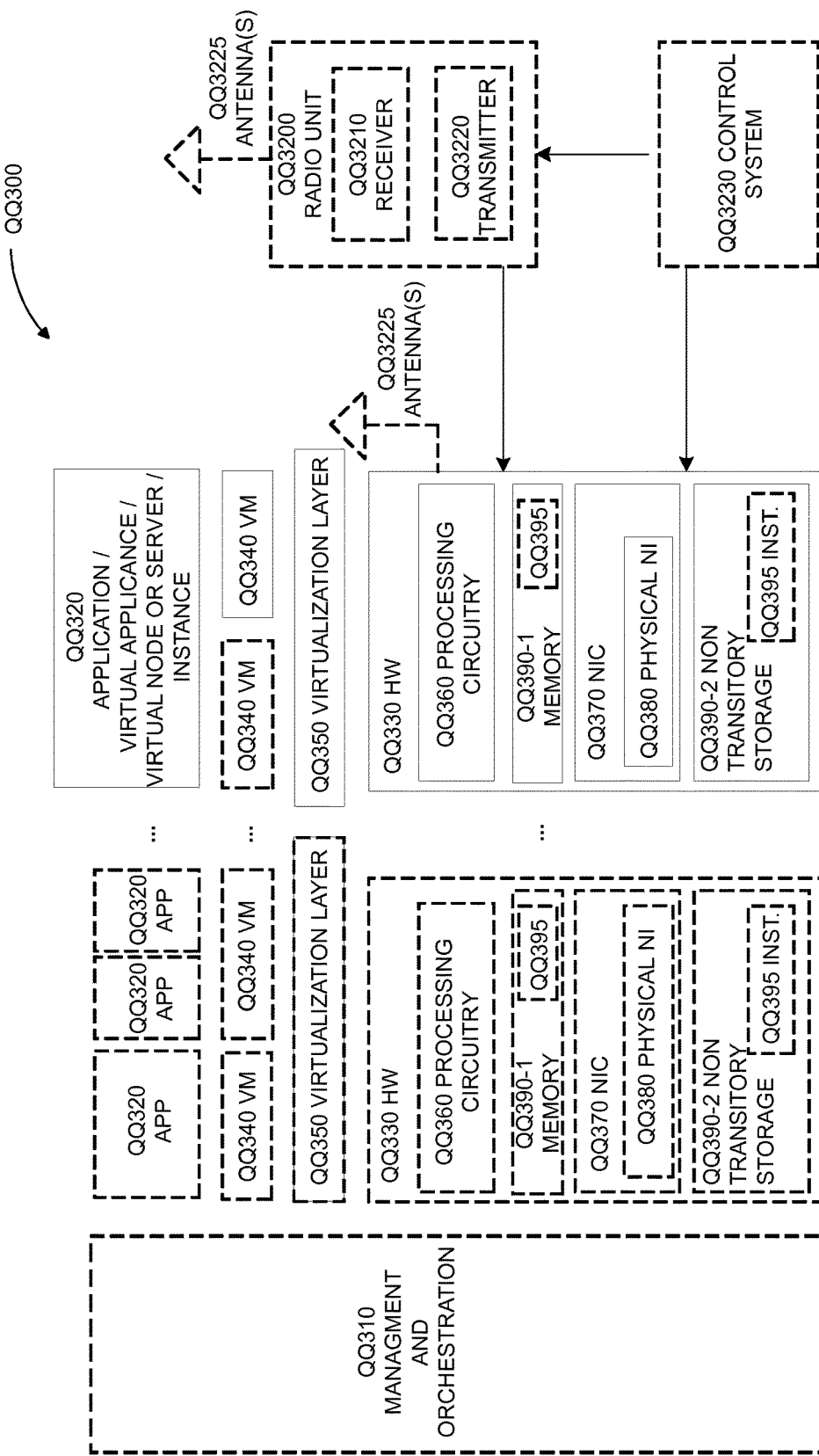
FIG. 15 is a schematic block diagram illustrating an example of a virtualization environment in which functions implemented by some embodiments may be virtualized.

FIG. 15 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 15, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 15.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 16:
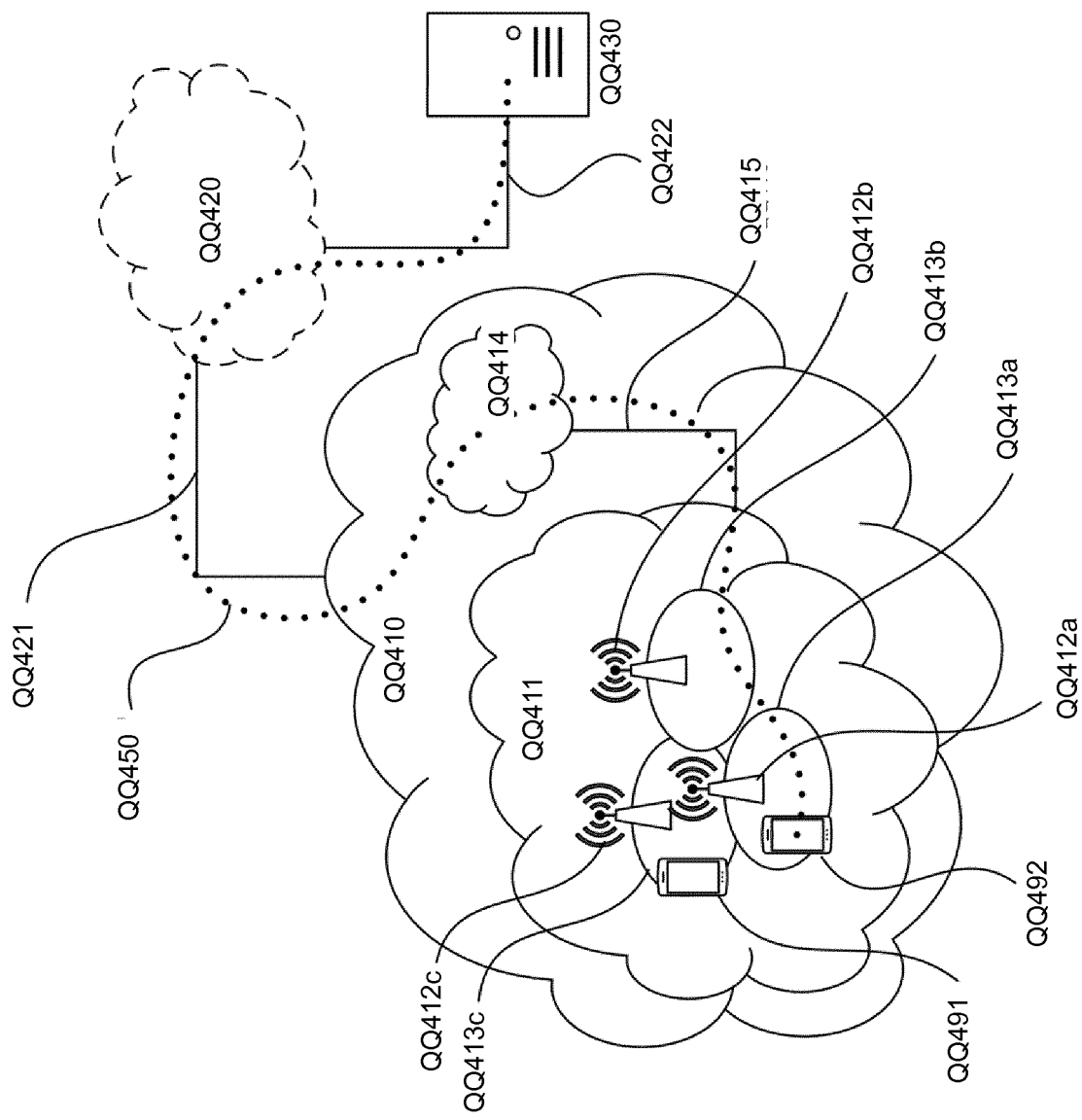
FIG. 16 is a schematic diagram illustrating an example of a telecommunication network connected via an intermediate network to a host computer in accordance with some embodiments.

FIG. 16 is a schematic diagram illustrating an example of a telecommunication network connected via an intermediate network to a host computer in accordance with some embodiments.

With reference to FIG. 16, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 16 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 17:
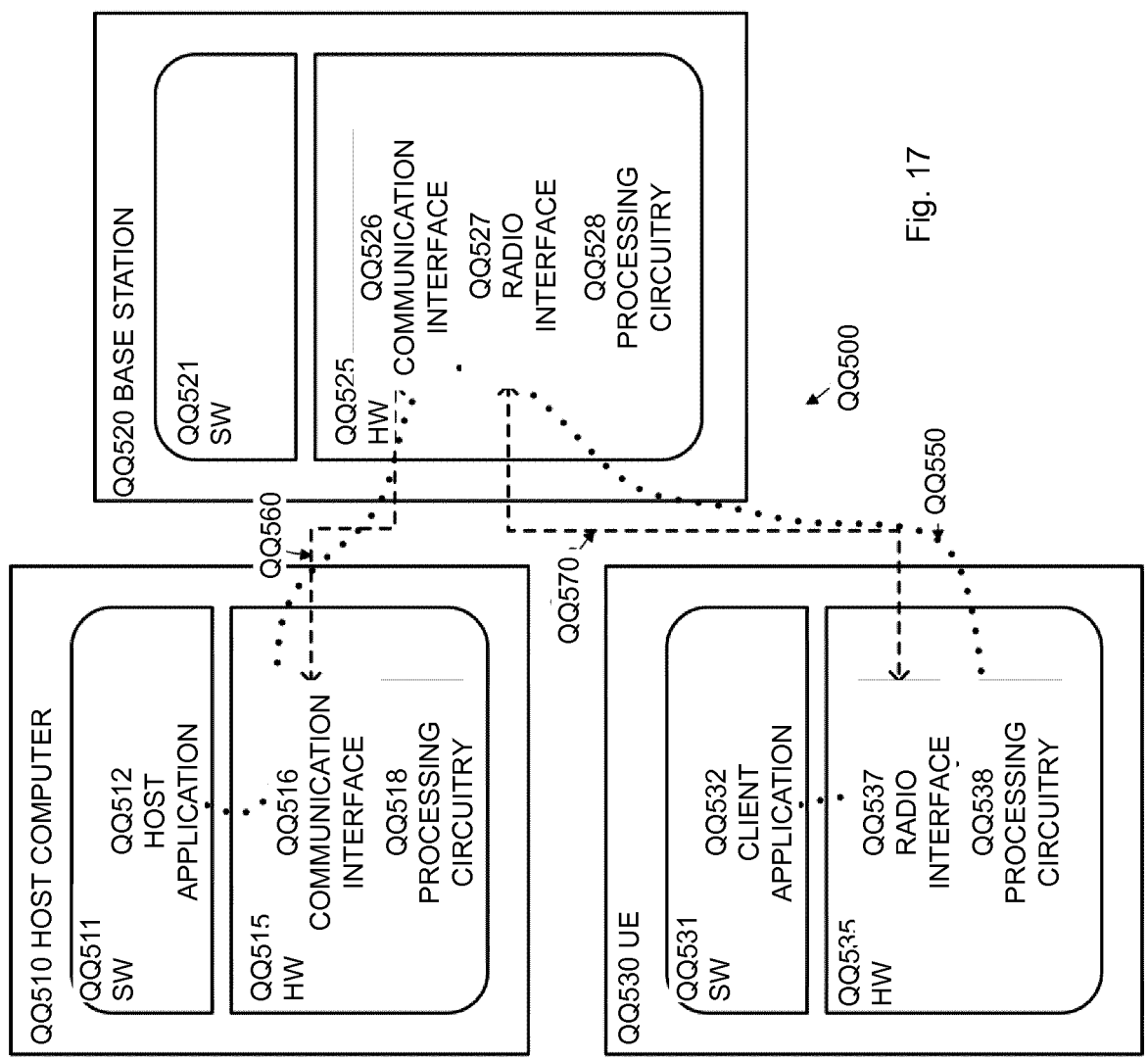
FIG. 17 is a schematic diagram illustrating an example of a host computer communicating via a base station with a user equipment over a partially wireless connection in accordance with some embodiments.

FIG. 17 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 17. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 17) served by base station QQ520. Communication interface QQ526 may be configured to facilitate connection QQ560 to host computer QQ510. Connection QQ560 may be direct or it may pass through a core network (not shown in FIG. 17) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 17 may be similar or identical to host computer QQ430, one of base stations QQ412a, QQ412b, QQ412c and one of UEs QQ491, QQ492 of FIG. M, respectively. This is to say, the inner workings of these entities may be as shown in FIG. 17 and independently, the surrounding network topology may be that of FIG. 16.

In FIG. 17, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 18:
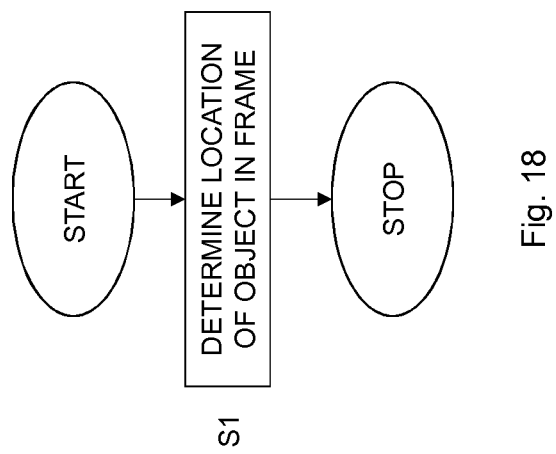
FIG. 18 is a flow chart of an object tracking method according to an embodiment.

A further aspect of the embodiments relates to an object tracking device method, see FIG. 18. The method comprises determining, in step S1 a location of an object in a current frame of a video stream, at a point in time following output of a preceding frame of the video stream but preceding output of the current frame, by starting from a location of the object determined by an OD server for a previous frame of the video stream and recursively tracking the location of the object in frames of the video stream following the previous frame up to the current frame and recursively updating a model of the object up to a model of the object associated with the current frame. Each model associated with a given frame of the video stream comprises at least one object feature representation extracted from at least one frame of the video stream preceding the given frame.

In an embodiment, the method also additional, optional steps as shown in FIG. 19. The method continues from step S1 in FIG. 18. A next step S2 comprises augmenting the current frame with perceptual information based on the location of the object in the current frame. This embodiment also comprises outputting, in step S3, the augmented current frame.

FIG. 20 is a flow chart illustrating additional, optional steps of the method shown in FIG. 18 according to an embodiment. This embodiment comprises recursively tracking, in step S10, the location of the object by starting from the location of the object determined by the OD server for the previous frame and tracking the location of the object, in each video frame of a set of video frames following the previous frame and ordered in output order, based on a location of the object in a preceding frame of the set or, for the first video frame of the set, the location of the object determined by the OD server, and a model of the object associated with the video frame of the set.

In an embodiment, the method also comprises step S11. This step S11 comprises recursively updating the model of the object, in each video frame of a set of video frames following the previous frame and ordered in output order, based on the model associated with the video frame of the set and at least one object feature representation extracted from the video frame of the set. The method then ends or continues to step S2 in FIG. 19.

In an embodiment, step S1 of FIG. 18 comprises determining the location $B_n$ of the object in the current frame $I_n$ by recursively tracking the location of the object and recursively updating the model of the object by, i=1 and m, n, k are positive integers, and for each frame $I_{n-k+im}$ of the video stream until n−k+im=n. In this embodiment, see FIG. 21, the method also comprises tracking, in step S24, the location $B_{n-k+im}$ of the object in frame $I_{n-k+im}$ based on the location $B_{n-k+(i-1)m}$ of the object in frame $I_{n-k+(i-1)m}$ and a model $M_{n-k+im}$ of the object associated with frame $I_{n-k+im}$. The location $B_{n-k}$ of the object in frame $I_{n-k}$ is determined by the OD server. The method also comprises increasing i by one in step S25 and updating, in step S26, the model $M_{n-k+im}$ of the object associated with frame $I_{n-k+im}$ based on the model $M_{n-k+(i-1)m}$ of the object associated with frame $I_{n-k+(i-1)m}$ and at least one object feature representation $X_{n-k+(i-1)m}$ extracted from frame $I_{n-k+(i-1)m}$.

In a particular embodiment, the embodiment as shown in FIG. 21 comprises the optional step S22 of setting the counter i to its initial value, preferably one. A next optional step S23 comprises checking whether n−k+im<n. If n−k+im is smaller than n the method continues to steps S24 to S26 as described above. The method then returns to step S23, where a new check following the update of the value of the counter i in step S25.

If the check in step S23 instead confirms that n−k+im is larger than n the method ends or continues to step S2 in FIG. 19.

In an embodiment, step S24 of FIG. 21 comprises determining the location $B_{n-k+im}$ of the object in frame $I_{n-k+im}$ based on $$B_{n-k+im} = \underset{B^*, m}{\operatorname{argmax}}\; d(X_{n-k+im}(B^*), X_m).$$

In an embodiment, the method comprises an additional, optional step S21 as shown in FIG. 22. This step S21 comprises comparing the parameter k with a parameter θ representing the number of frames that can be processed in terms of tracking the location of an object and update the model of the object during the period of time between output of the preceding frame of the video stream and output of the current frame. If k≤θ, the method continues to step S1 in FIG. 18, which comprises, in this embodiment, determining the location of the object in the current frame by recursively tracking the location of the object in frames of the video stream and recursively updating the model of the object. If k>θ, the method continues to step S22 in FIG. 21.

In an embodiment, the method comprises an additional, optional step S20 as shown in FIG. 22. This step S20 comprises determining a value of the parameter m based on at least one of an available processing power and an available battery capacity.

In an embodiment, the method also comprises the optional step S27. If the comparison in step S21 concludes that k>θ, the method continues to step S27. This step S27 comprises, in an embodiment, increasing the value of the parameter m, typically to a value equal to or larger than two. The method then continues to step S1 in FIG. 1.

In another embodiment, step S27 instead comprises tracking the location of the object in the current frame using the tracked location of the object in the preceding frame and the model of the object associated with the current frame (option 1). The method then ends or continues to step S2 in FIG. 19.

In an embodiment, the method comprises additional, optional steps S30 and S31 as shown in FIG. 23. Step S30 comprises receiving, from the OD server, information of the location of the object determined by the OD server for the previous frame and a timestamp associated with the previous frame. The method also comprises identifying, in the step S31, the previous frame based on the timestamp received from the OD server. The method then continues to step S1 in FIG. 18 or to the optional step S32.

Step S32 comprises removing object feature representations from the model of the object associated with the current frame to obtain a model of the object associated with the previous frame. The method then continues to step S1 in FIG. 18.

FIG. 24 is a flow chart illustrating an additional, optional step of the method shown in FIG. 18. This optional step S40 comprises determining, at the point in time following output of the preceding frame but preceding output of the current frame, whether information of the location of the object determined by the OD server for the previous frame has been received from the OD server. If the information has been received from the OD server the method continues to step S1 in FIG. 18. In this embodiment, step S1 comprises determining the location of the object in the current frame by recursively tracking the location of the object in frames of the video stream and recursively updating the model of the object if the information has been received from the OD server.

In an embodiment, if the information has not been received from the OD server as verified in step S40, the method continues to step S41. This step S41 comprises determining the location of the object in the current frame based on a location of the object determined for the preceding frame and the model of the object associated with the current frame. The method then ends or continues to step S2 in FIG. 19.

Figure 25:
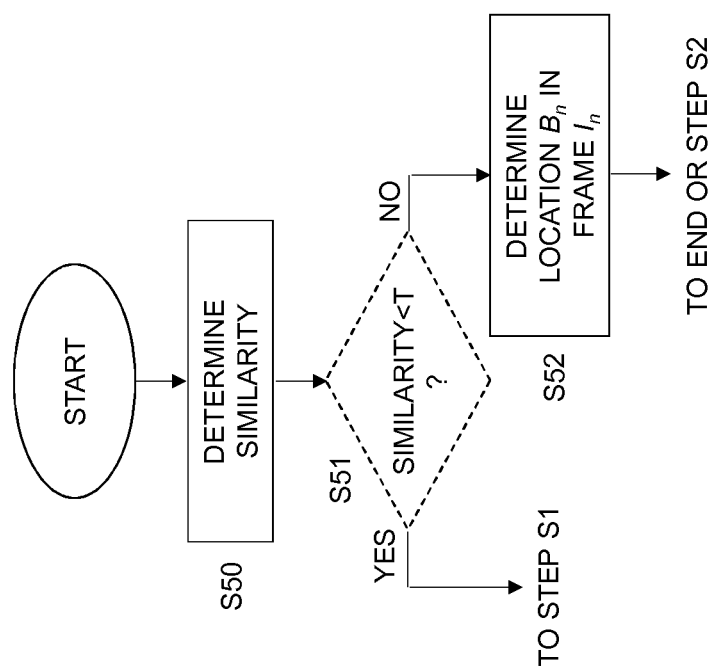
FIG. 25 is a flow chart illustrating additional, optional steps of the method shown in FIG. 18 according to an embodiment.

FIG. 25 is a flow chart illustrating an additional, optional step of the method shown in FIG. 18. In this embodiment, the current frame comprises multiple objects The method comprises determining, in step S50 and for each object of the multiple objects, a similarity between the location of the object determined by the OD server for the previous frame and a location of the object determined by an OT device for the preceding frame. In this embodiment, step S1 of FIG. 18 comprises determining, in an order defined based on the determined similarities starting with an object of the multiple objects having the lowest similarity, the location of the object in the current frame by recursively track the location of the object in frames of the video stream and recursively update the model of the object.

In another embodiment, step S1 comprises determining, for an object of the multiple objects, the location of the object in the current frame by recursively tracking the location of the object in frames of the video stream and recursively updating the model of the object if the similarity determined for the object is below a minimum similarity.

In this another embodiment, the method optionally comprises an additional step S52. This step S52 comprises determining, for an object of the multiple objects, the location of the object in the current frame based on a location of the object determined for the preceding frame and the model of the object associated with the current frame if the similarity determined for the object is equal to or exceeds the minimum similarity.

The method then ends or continues to step S2 in FIG. 19.

In an embodiment, the method also comprises the optional step S51, which compares the similarity determined for an object with the minimum similarity represented by T in FIG. 25. If the similarity is less than the minimum similarity as determined in step S51, the method continues to step S1, otherwise it continues from step S51 to step S52.

Figure 26:
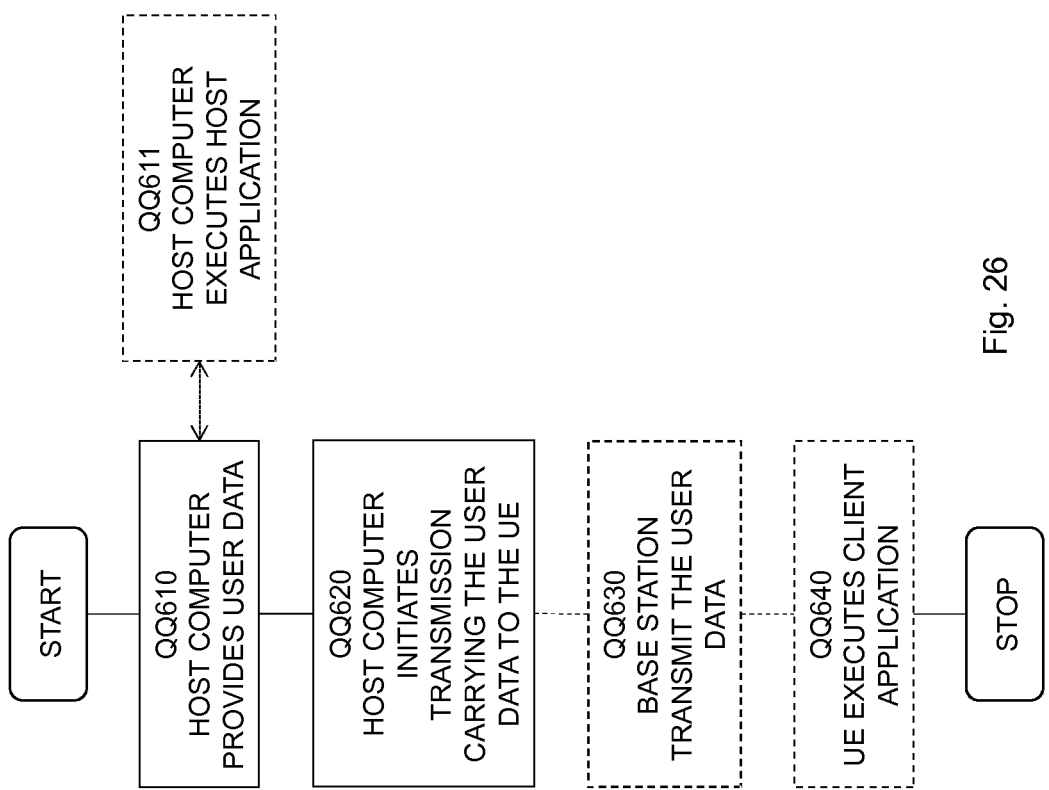
FIG. 26 is a flowchart illustrating a method implemented in a communication system in accordance with an embodiment.
Figures 27, 28:
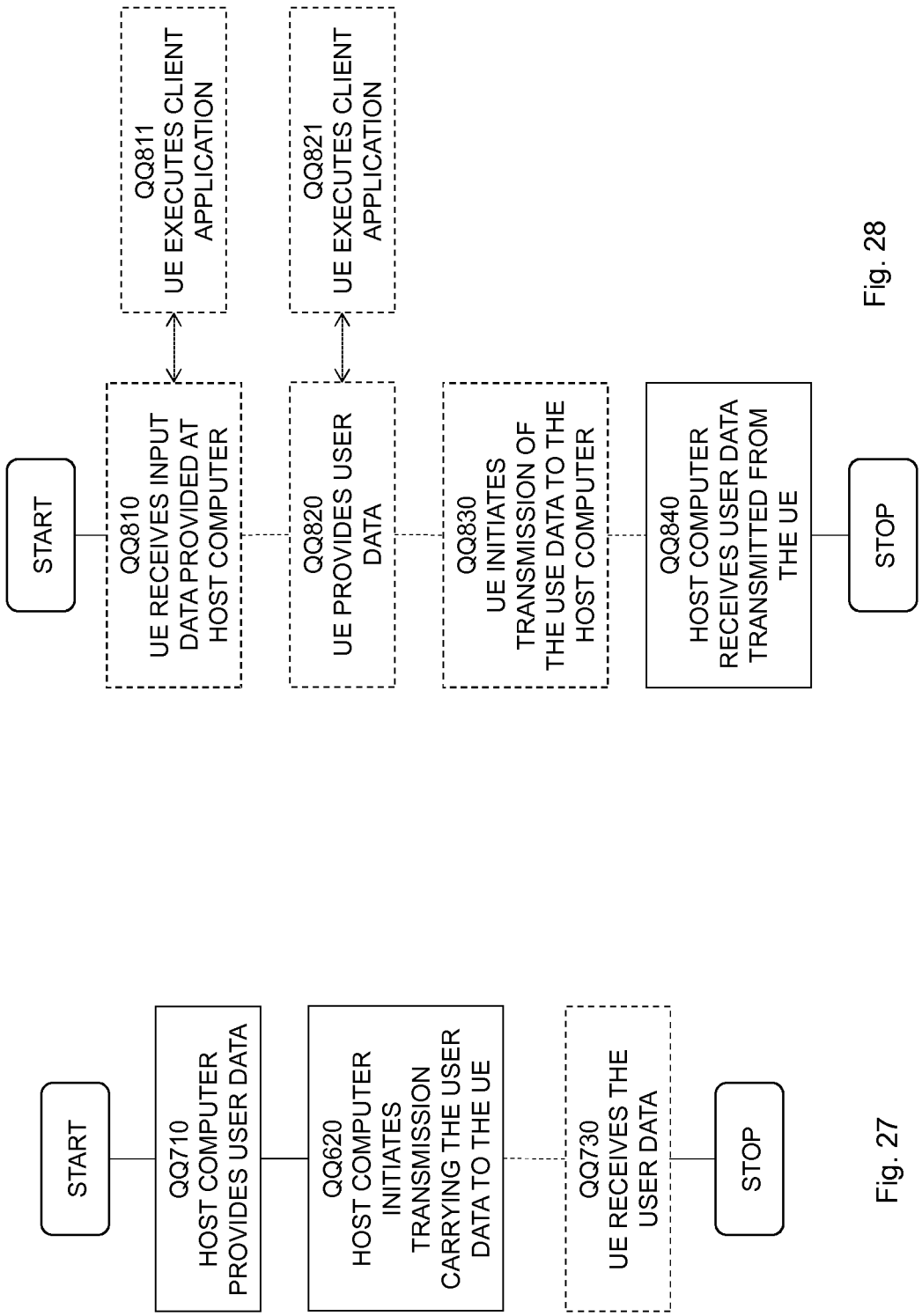
FIG. 27 is a flowchart illustrating a method implemented in a communication system in accordance with an embodiment.
FIG. 28 is a flowchart illustrating a method implemented in a communication system in accordance with an embodiment.

FIGS. 26 and 28 are schematic flow diagrams illustrating examples of methods implemented in a communication system including, e.g. a host computer, and optionally also a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 13 to 17. For simplicity of the present disclosure, only drawing references to FIG. 26 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 27 is a flowchart illustrating a method implemented in a communication system, in accordance with one embodiment. The communication system includes a host computer, a base station and a UE which may be those described with reference to FIGS. 13 to 17. For simplicity of the present disclosure, only drawing references to FIG. 27 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIGS. 28 and 29 are schematic diagrams illustrating examples of methods implemented in a communication system including a host computer, a base station and a user equipment in accordance with some embodiments.

FIG. 28 is a flowchart illustrating a method implemented in a communication system, in accordance with one embodiment. The communication system includes a host computer, a base station and a UE which may be those described with reference to FIGS. 13 to 17. For simplicity of the present disclosure, only drawing references to FIG. 28 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 29 is a flowchart illustrating a method implemented in a communication system, in accordance with one embodiment. The communication system includes a host computer, a base station and a UE which may be those described with reference to FIGS. 13 to 17. For simplicity of the present disclosure, only drawing references to FIG. 29 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting numbered embodiments will be given.

Group A Embodiments

1. A method performed by a wireless device for object tracking. The method comprising determining a location of an object in a current frame of a video stream, at a point in time following output of a preceding frame of the video stream but preceding output of the current frame, by starting from a location of the object determined by an object-detection server for a previous frame of the video stream and recursively tracking the location of the object in frames of the video stream following the previous frame up to the current frame and recursively updating a model of the object up to a model of the object associated with the current frame. Each model associated with a given frame of the video stream comprises at least one object feature representation extracted from at least one frame of the video stream preceding the given frame.

2. The method of embodiment 1, further comprising:
   providing user data; and
   forwarding the user data to a host computer via the transmission to the target network node.

Group B Embodiments

3. A wireless device comprising processing circuitry configured to perform any of the steps of any of the Group A embodiments.

4. A user equipment (UE) comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

5. A user equipment (UE) configured to communicate with a base station, the UE comprising a radio interface and processing circuitry configured to perform any of the steps of any of the Group A embodiments.

6. A communication system including a host computer comprising:
   processing circuitry configured to provide user data; and
   a communication interface configured to forward user data to a cellular network for transmission to a user equipment (UE),
   wherein the UE comprises a radio interface and processing circuitry, the UE's components configured to perform any of the steps of any of the Group A embodiments.

7. The communication system of embodiment 6, wherein the cellular network further includes a base station configured to communicate with the UE.

8. The communication system of embodiment 6 or 7, wherein:
   the processing circuitry of the host computer is configured to execute a host application, thereby providing the user data; and
   the UE's processing circuitry is configured to execute a client application associated with the host application.

9. A method implemented in a communication system including a host computer, a base station and a user equipment (UE), the method comprising:
   at the host computer, providing user data; and
   at the host computer, initiating a transmission carrying the user data to the UE via a cellular network comprising the base station, wherein the UE performs any of the steps of any of the Group A embodiments.

10. The method of embodiment 9, further comprising at the UE, receiving the user data from the base station.

11. A communication system including a host computer comprising:
    communication interface configured to receive user data originating from a transmission from a user equipment (UE) to a base station,
    wherein the UE comprises a radio interface and processing circuitry, the UE's processing circuitry configured to perform any of the steps of any of the Group A embodiments.

12. The communication system of embodiment 11, further including the UE.

13. The communication system of embodiment 11 or 12, further including the base station, wherein the base station comprises a radio interface configured to communicate with the UE and a communication interface configured to forward to the host computer the user data carried by a transmission from the UE to the base station.

14. The communication system of any of the embodiments 11 to 13, wherein:
    the processing circuitry of the host computer is configured to execute a host application; and
    the UE's processing circuitry is configured to execute a client application associated with the host application, thereby providing the user data.

15. The communication system of any of the embodiments 11 to 14, wherein:
    the processing circuitry of the host computer is configured to execute a host application, thereby providing request data; and
    the UE's processing circuitry is configured to execute a client application associated with the host application, thereby providing the user data in response to the request data.

16. A method implemented in a communication system including a host computer, a base station and a user equipment (UE), the method comprising:
    at the host computer, receiving user data transmitted to the base station from the UE, wherein the UE performs any of the steps of any of the Group A embodiments.

17. The method of embodiment 16, further comprising, at the UE, providing the user data to the base station.

18. The method of embodiment 16 or 17, further comprising:
    at the UE, executing a client application, thereby providing the user data to be transmitted; and
    at the host computer, executing a host application associated with the client application.

19. The method of any of the embodiments 16 to 18, further comprising:
    at the UE, executing a client application; and
    at the UE, receiving input data to the client application, the input data being provided at the host computer by executing a host application associated with the client application,
    wherein the user data to be transmitted is provided by the client application in response to the input data.

20. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.

21. The method of embodiment 20, further comprising at the base station, receiving the user data from the UE.

22. The method of embodiment 20 or 21, further comprising at the base station, initiating a transmission of the received user data to the host computer.

Group C Embodiments

23. A method for object tracking, wherein the method comprises determining a location of an object in a current frame of a video stream, at a point in time following output of a preceding frame of the video stream but preceding output of the current frame, by starting from a location of the object determined by an object-detection server for a previous frame of the video stream and recursively tracking the location of the object in frames of the video stream following the previous frame up to the current frame and recursively updating a model of the object up to a model of the object associated with the current frame. Each model associated with a given frame of the video stream comprises at least one object feature representation extracted from at least one frame of the video stream preceding the given frame.

24. A device configured to object tracking, wherein the device is configured to perform determining a location of an object in a current frame of a video stream, at a point in time following output of a preceding frame of the video stream but preceding output of the current frame, by starting from a location of the object determined by an object-detection server for a previous frame of the video stream and recursively tracking the location of the object in frames of the video stream following the previous frame up to the current frame and recursively updating a model of the object up to a model of the object associated with the current frame. Each model associated with a given frame of the video stream comprises at least one object feature representation extracted from at least one frame of the video stream preceding the given frame.

25. A wireless device comprising a device according to embodiment 24.

26. A network node comprising a device according to embodiment 24.

27. A network device comprising a device according to embodiment 24.

28. A computer program comprising instructions, which when executed by at least one processor, cause the at least one processor to determine a location of an object in a current frame of a video stream, at a point in time following output of a preceding frame of the video stream but preceding output of the current frame, by starting from a location of the object determined by an object-detection server for a previous frame of the video stream and recursively tracking the location of the object in frames of the video stream following the previous frame up to the current frame and recursively updating a model of the object up to a model of the object associated with the current frame. Each model associated with a given frame of the video stream comprises at least one object feature representation extracted from at least one frame of the video stream preceding the given frame.

29. A computer-program product comprising a computer-readable medium having stored thereon a computer program of embodiment 28.

30. An apparatus for object tracking wherein the apparatus comprises:
a module for determining a location of an object in a current frame of a video stream, at a point in time following output of a preceding frame of the video stream but preceding output of the current frame, by starting from a location of the object determined by an object-detection server for a previous frame of the video stream and recursively tracking the location of the object in frames of the video stream following the previous frame up to the current frame and recursively updating a model of the object up to a model of the object associated with the current frame. Each model associated with a given frame of the video stream comprises at least one object feature representation extracted from at least one frame of the video stream preceding the given frame.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An object tracking device configured to determine a location of an object in a current frame of a video stream, at a point in time following output of a preceding frame of the video stream but preceding output of the current frame, the object tracking device comprising:
a processor; and
a memory comprising instructions executable by the processor, whereby the object tracking device is operable to perform the following operations based on a location of the object determined by an object-detection server for a previous frame of the video stream:
recursively track the location of the object in frames of the video stream following the previous frame up to the current frame; and
recursively update a model of the object for the frames of the video stream up to a model of the object associated with the current frame,
wherein each model update associated with a particular frame of the video stream comprises at least one object feature representation extracted from at least one frame preceding the particular frame.

2. The object tracking device according to claim 1, wherein execution of the instructions by the processor further configures the object tracking device to:
augment the current frame with perceptual information based on the location of the object in the current frame; and
output the augmented current frame.

3. The object tracking device according to claim 1, wherein execution of the instructions by the processor configures the object tracking device to recursively track the location of the object by tracking the location of the object in each particular frame of a set of frames following the previous frame and ordered in output order, based on the model of the object associated with the particular frame and on one of the following:
a location of the object in a preceding frame of the set, or for the first frame of the set, the location of the object determined by the object-detection server.

4. The object tracking device according to claim 1, wherein execution of the instructions by the processor configures the object tracking device to recursively update the model of the object by updating the model for each particular frame of a set of frames following the previous frame and ordered in output order, based on the model associated with the particular frame and at least one object feature representation extracted from the particular frame.

5. The object tracking device according to claim 1, wherein execution of the instructions by the processor configures the object tracking device to determine the location B[n] of the object in the current frame I[n] by recursively tracking the location of the object and recursively updating the model of the object for each frame I[n−k+im] of the video stream, starting with i=1 and until n−k+im=n, by:
tracking the location B[n−k+im] of the object in frame I[n−k+im] based on the location B[n−k+(i−1)m] of the object in frame I[n−k+(i−1)m] and a model M[n−k+im] of the object associated with frame I[n−k+im], wherein the location B[n−k] of the object in frame I[n−k] is determined by the object-detection server;
increasing i by one; and
updating the model M[n−k+im] of the object associated with frame I[n−k+im] based on the model M[n−k+(i−1)m] of the object associated with frame I[n−k+(i−1)m] and at least one object feature representation X[n−k+(i−1)m] extracted from frame I[n−k+(i−1)m],
wherein parameters m, n, k are positive integers.

6. The object tracking device according to claim 5, wherein execution of the instructions by the processor configures the object tracking device to determine the location B[n−k+im] of the object in frame I[n−k+im] based on $$B[n-k+im]=\arg(\max_{(B^*,m)} d(X[n-k+im](B^*),X[m])\text{over}\ (B^*,m)),$$

wherein:
B[n−k+im] indicates a bounding box representation for the object,
the bounding box representation defines a coordinate for a bounding box enclosing the object in frame I[n−k+im] and a size of the bounding box,
d(•) is a similarity measure representing a similarity between object feature representations,
X[m] indicates an object feature representation belonging to the model M[n−k+im] of the object associated with frame I[n−k+im], and
X[n](B*) indicates an object feature representation extracted from location B* in frame I[n−k+im].

7. The object tracking device according to claim 5, wherein execution of the instructions by the processor configures the object tracking device to:
compare the parameter k with a parameter θ representing a number of frames that the object tracking device can process in terms of tracking the location of an object and updating the model of the object during the period of time between output of the preceding frame of the video stream and output of the current frame; and
based on k≤θ, determine the location of the object in the current frame by recursively tracking the location of the object and recursively updating the model of the object in frames of the video stream.

8. The object tracking device according to claim 5, wherein execution of the instructions by the processor configures the object tracking device to determine a value of the parameter m based on at least one of a processing power available for the object tracking device and a capacity of a battery configured to provide power to the object tracking device.

9. The object tracking device according to claim 1, wherein execution of the instructions by the processor configures the object tracking device to:
receive, from the object-detection server, information about the location of the object determined by the object-detection server for the previous frame and a timestamp associated with the previous frame; and
identify the previous frame based on the timestamp received from the object-detection server.

10. The object tracking device according to claim 1, wherein execution of the instructions by the processor configures the object tracking device to remove object feature representations from the model of the object associated with the current frame to obtain a model of the object associated with the previous frame.

11. The object tracking device according to claim 1, wherein execution of the instructions by the processor configures the object tracking device to:
determine, at the point in time following output of the preceding frame but preceding output of the current frame, whether the object tracking device has received, from the object-detection server, information about the location of the object determined by the object-detection server for the previous frame; and
based on determining that the object tracking device has received the information, determine the location of the object in the current frame by recursively tracking the location of the object and recursively updating the model of the object in frames of the video stream.

12. The object tracking device according to claim 11, wherein execution of the instructions by the processor configures the object tracking device to, based on determining that the object tracking device has not received the information determine the location of the object in the current frame based on a location of the object determined by the object tracking device for the preceding frame and the model of the object associated with the current frame.

13. The object tracking device according to claim 1, wherein the current frame comprises multiple objects and execution of the instructions by the processor configures the object tracking device to:
determine, for each object of the multiple objects, a similarity between the location of the object as determined by the object-detection server for the previous frame and a location of the object as determined by the object tracking device for the preceding frame; and
starting with one of the multiple objects having the lowest similarity and proceeding in an order based on increasing similarity, determining the respective locations of the multiple objects in the current frame by recursively tracking the respective locations of the object in frames of the video stream and recursively updating the respective models of the objects.

14. The object tracking device according to claim 1, wherein the current frame comprises multiple objects and execution of the instructions by the processor configures the object tracking device to:
determine, for each object of the multiple objects, a similarity between the location of the object as determined by the object-detection server for the previous frame and a location of the object as determined by the object tracking device for the preceding frame; and
based on the similarity for a first one of the multiple objects being below a minimum similarity, determining the location of the first object in the current frame by recursively tracking the location of the first object and recursively updating the model of the first object in frames of the video stream.

15. The object tracking device according to claim 14, wherein execution of the instructions by the processor configures the object tracking device to, based on the similarity for a second one of the multiple objects being greater than or equal to the minimum similarity, determining the location of the second object in the current frame based on a location of the second object determined by the object tracking device for the preceding frame and the model of the second object associated with the current frame.

16. A wireless device comprising:
an object tracking device according to claim 1;
a camera configured to record video and generate a video stream;
a transmitter configured to transmit frames of the video stream to an object detection server; and
a receiver configured to receive information about respective locations of one or more objects in the frames, as determined by the object detection server.

17. A method for an object tracking device, the method comprising:
determining a location of an object in a current frame of a video stream, at a point in time following output of a preceding frame of the video stream but preceding output of the current frame, by performing the following operations based on a location of the object determined by an object-detection server for a previous frame of the video stream:
recursively tracking the location of the object in frames of the video stream following the previous frame up to the current frame; and
recursively updating a model of the object for the frames of the video stream up to a model of the object associated with the current frame,
wherein each model update associated with a particular frame of the video stream comprises at least one object feature representation extracted from at least one frame preceding the particular frame.

18. The method according to claim 17, wherein determining the location comprises determining the location $B[n]$ of the object in the current frame $I[n]$ by recursively tracking the location of the object and recursively updating the model of the object for each frame $I[n-k+im]$ of the video stream, starting with $i=1$ and until $n-k+im=n$, by:
tracking the location $B[n-k+im]$ of the object in frame $I[n-k+im]$ based on the location $B[n-k+(i-1)m]$ of the object in frame $I[n-k+(i-1)m]$ and a model $M[n-k+im]$ of the object associated with frame $I[n-k+im]$, wherein the location $B[n-k]$ of the object in frame $I[n-k]$ is determined by the object-detection server;
increasing i by one; and
updating the model $M[n-k+im]$ of the object associated with frame $I[n-k+im]$ based on the model $M[n-k+(i-1)m]$ of the object associated with frame $I[n-k+(i-1)m]$ and at least one object feature representation $X[n-k+(i-1)m]$ extracted from frame $I[n-k+(i-1)m]$,
wherein parameters m, n, k are positive integers.

19. The method according to claim 18, wherein determining the location comprises determining the location $B[n-k+im]$ of the object in frame $I[n-k+im]$ based on $$B[n-k+im]=\arg\max_{(B^*,m)} \, d(X[n-k+im](B^*),X[m]) \text{ over}$$

wherein:
$B[n-k+im]$ indicates a bounding box representation for the object,
the bounding box representation defines a coordinate for a bounding box enclosing the object in frame $I[n-k+im]$ and a size of the bounding box,
$d(\cdot)$ is a similarity measure representing a similarity between object feature representations,
$X[m]$ indicates an object feature representation belonging to the model $M[n-k+im]$ of the object associated with frame $I[n-k+im]$, and
$X[n](B^*)$ indicates an object feature representation extracted from location $B^*$ in frame $I[n-k+im]$.

* * * * *